US011704510B2

(12) United States Patent
Volkerink et al.

(10) Patent No.: US 11,704,510 B2
(45) Date of Patent: Jul. 18, 2023

(54) ASSOCIATING ASSETS USING RFID-RF WIRELESS GATEWAYS

(71) Applicant: Trackonomy Systems, Inc., San Jose, CA (US)

(72) Inventors: Hendrik J Volkerink, Palo Alto, CA (US); Ajay Khoche, West San Jose, CA (US)

(73) Assignee: TRACKONOMY SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/953,238

(22) Filed: Nov. 19, 2020

(65) Prior Publication Data
US 2021/0150159 A1    May 20, 2021

Related U.S. Application Data

(60) Provisional application No. 62/937,501, filed on Nov. 19, 2019.

(51) Int. Cl.
| | | |
|---|---|---|
| G06K 7/08 | (2006.01) | |
| G06K 7/10 | (2006.01) | |
| G06K 19/077 | (2006.01) | |

(52) U.S. Cl.
CPC ... *G06K 7/10366* (2013.01); *G06K 19/07758* (2013.01)

(58) Field of Classification Search
CPC .......... G06K 7/10366; G06K 19/07758; B01L 2300/022; B01L 3/5453; G06Q 10/0833
See application file for complete search history.

(56) References Cited

U.S. PATENT DOCUMENTS

| | | |
|---|---|---|
| 7,299,990 B2 | 11/2007 | Hoshina |
| 7,743,984 B2 | 6/2010 | Olsen et al. |
| 8,016,194 B2 | 9/2011 | Hause et al. |
| 8,317,230 B2 | 11/2012 | Asay |
| 8,581,701 B2 | 11/2013 | Steinmetz et al. |
| 8,833,664 B2 | 9/2014 | Choi |
| 9,251,459 B2 | 2/2016 | Simske et al. |
| 10,095,898 B2 | 10/2018 | Iqbal et al. |

(Continued)

OTHER PUBLICATIONS

U.S. Appl. No. 16/839,048, Ex Parte Quayle Action dated Jul. 22, 2021, 6 pages.

(Continued)

*Primary Examiner* — Jamara A Franklin

(57) ABSTRACT

A system is disclosed for tracking and monitoring sets of assets in or on a container using RFID-RF tags associated with the assets. The system comprises a specimen holder bin or similar container and a wireless tag affixed to the specimen holder bin. The specimen bin holder is configured to hold a plurality of assets. The wireless tag comprises a radio frequency identifier (RFID) circuit, a radio frequency (RF) circuit, a processor, a memory storing an identifier (ID) associated with the RFID circuit, and an energy source electrically connected to the RFID circuit, the RF circuit, and the processor. The wireless tag is configured to broadcast the identifier associated with the RFID circuit responsive to an interrogation signal by one or more gateways associated with the system. In some embodiments, each asset of the plurality of assets additionally comprises an RFID tag.

21 Claims, 14 Drawing Sheets

(56) References Cited

U.S. PATENT DOCUMENTS

| | | | |
|---|---|---|---|
| 2005/0099292 A1 | 5/2005 | Sajkowsky | |
| 2007/0008120 A1* | 1/2007 | Smith | G06Q 10/08 340/539.26 |
| 2008/0198022 A1 | 8/2008 | Battles et al. | |
| 2010/0089803 A1 | 4/2010 | Lavi et al. | |
| 2011/0062237 A1 | 3/2011 | Chaves | |
| 2014/0263634 A1 | 9/2014 | Iqbal | |
| 2015/0097674 A1 | 4/2015 | Mondal et al. | |
| 2016/0011074 A1 | 1/2016 | Mian et al. | |
| 2017/0083857 A1 | 3/2017 | Barton et al. | |
| 2017/0286903 A1 | 10/2017 | Elizondo, II | |
| 2018/0163095 A1 | 6/2018 | Khoche | |
| 2019/0087702 A1 | 3/2019 | Cotoc | |
| 2020/0234098 A1 | 7/2020 | Volkerink | |
| 2021/0027122 A1 | 1/2021 | Volkerink | |

OTHER PUBLICATIONS

U.S. Appl. No. 16/839,048, Notice of Allowance, dated Nov. 29, 2021, 8 pages.
U.S. Appl. No. 17/067,608, Notice of Allowance, dated Dec. 1, 2021, 9 pages.
PCT International Search Report and Written opinion of the International Search Authority, International Application No. PCT/US2020/061394. International search completed Jan. 3, 2021. International Search Report dated Feb. 26, 2021. pp. 1-16.

* cited by examiner

```
                    DATABASE
                                                         ─ 610
SPECIMEN HOLDER BIN 1:

Vial RFIDs        First Bin RF IDs    Second Bin RF IDs

RFID A001         RFID B001           BLEID C001

RFID A002
    •
    •
    •
RFID A015

SPECIMEN HOLDER BIN 2:
    •
    •
    •
```

ASSOCIATING ASSETS USING RFID-RF WIRELESS GATEWAYS

The present disclosure claims priority to U.S. Provisional Patent Application No. 62/937,501, filed Nov. 19, 2019, which is incorporated herein in its entirety.

TECHNICAL FIELD

Embodiments disclosed herein generally relate to wireless sensors and communications devices and systems for tracking and monitoring assets.

BACKGROUND

Wireless sensors and communications devices and systems have been used for tracking and monitoring sets of items in or on a container. For example, radio frequency identifier (RFID) tags conventionally are used in the medical and chemical fields to store and track containers of specimens, such as medical specimens and chemical specimens.

SUMMARY

RFID tags and barcode tags have limited or no active communications capabilities. For example, a RFID tag typically is limited to storing a unique identifier in memory and wirelessly transmitting that unique identifier periodically or on demand. Barcodes on the other hand are passive tags without any active functionality; instead, a barcode is read by an optical scanner with line-of-sight visibility of the barcode. Given their limitations, RFID and barcode technologies are unable to perform advanced communications and locationing functions.

In an aspect, a system is disclosed for tracking and monitoring sets of items in or on a container using RFID-RF tags associated with the items. In an embodiment, the system comprises a specimen holder bin comprising a plurality of slots and a wireless tag affixed to the specimen holder bin, e.g., by an adhesive or other means. The plurality of slots are sized to receive a respective specimen holder (e.g., vials). The wireless tag comprises a radio frequency identifier (RFID) circuit, a radio frequency (RF) communication circuit (e.g., a Bluetooth communication interface), a processor, a memory storing an identifier (ID) associated with the RFID circuit, and an energy source electrically connected to the RFID circuit, the RF circuit, and the processor. In some embodiments, the wireless tag encapsulates the RFID circuit, the RF circuit, the processor, the memory, and the energy source. The system may further comprise a plurality of specimen holders in each of the plurality of slots, wherein each specimen holder comprises a respective RFID tag affixed to an exterior surface of the specimen holder, e.g., by an adhesive or other means.

In other embodiments, the system comprises a plurality of items, each item comprising a wireless tag affixed to the respective item. Each wireless tag comprises an RFID circuit, a RF circuit, a processor, a memory storing an ID associated with the RFID circuit, and an energy source electrically connected to the RFID circuit, the RF circuit, and the processor. The wireless tags are affixed to the respective item using, for example, an adhesive or other means.

In some embodiments, the system further comprises a gateway operable to broadcast an interrogation signal to the wireless tag. The RFID tag in the wireless circuit is operable to, in response, broadcast the identifier associated with the RFID circuit to the gateway. In some embodiments, the gateway is further operable to broadcast an interrogation signal to the wireless tags, and RFID circuits in the respective RFID tags are operable to broadcast identifiers associated with the specimen holders or the items in response, such that each specimen holder or each item of the plurality of specimen holders or items may be accounted for, tracked, and monitored.

In some embodiments, the gateway is further operable to broadcast an advertising packet to one or more RF circuits of the wireless tags. In response to receipt of the advertising packet, the one or more RF circuits are operable to establish a communication connection with the gateway. In some embodiments, the RF circuit is a Bluetooth Low Energy circuit, and the communication connection is a Bluetooth connection.

The following disclosure features methods, apparatus operable to implement the methods described herein, and computer-readable media storing computer-readable instructions causing a computer to implement the methods described herein.

Figure 1A:
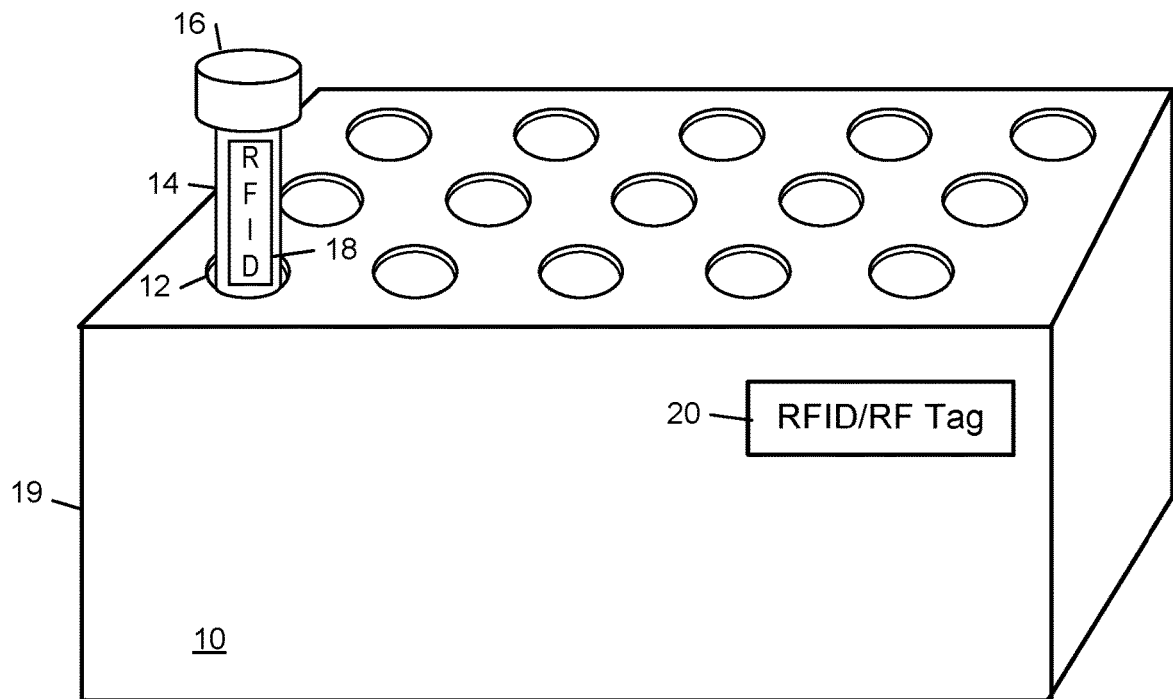
FIGS. 1A and 1B are perspective diagrams of two example specimen bins that includes a plurality of slots for holding respective specimen holders labeled with different wireless tags, according to some embodiments.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

DETAILED DESCRIPTION

Introduction

The present invention is not limited in any way to the embodiments described herein. Instead, the embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof. The term "metadata" include information about data objects or characteristics thereof. The terms "module," "manager," and "unit" refer to hardware, software, or firmware, or a combination thereof.

The terms "wireless tag," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, a card, a wireless tag, a tracking device, or the like, and as a wireless communications device. A "peripheral" tape node or wireless node, also referred to as an outer node, leaf node, or terminal node, refers to a node that does not have any child nodes.

In certain contexts, the terms "wireless tracking system," "hierarchical communications network," "distributed agent operating system," and the like are used interchangeably herein to refer to a system or network of wireless nodes.

Monitoring Sets of Assets Using RFID-RF Tags

Embodiments described herein relate to wireless sensors and communications tags, devices, and systems for tracking and monitoring assets. In particular, embodiments herein relate to methods and systems for tracking and monitoring assets being contained or transported within or as part of a container, e.g., specimens, vials, and the like contained within a sample bin. In conventional methods, containers having multiple assets are often tracked as a single item; however, this makes it difficult to identify whether individual assets are lost, damaged, or otherwise exposed to harmful conditions. It is valuable for each asset within a container to be accounted for during transportation, shipment, some other movement, storage, other phases of the asset, or some combination thereof in order to ensure that individual assets are not lost or damaged.

FIG. 1A shows a diagrammatic perspective view of a specimen sample bin 10 that includes a plurality of slots, including slot 12, for receiving specimen sample holders 14 (also referred to herein as "vials"). The vial 14 shown in FIG. 1A includes a stopper 16 and an RFID tag 18. The vial 14 is an example of an asset, and the specimen sample bin 10 is an example of a container for one or more assets including the vial 14. In some embodiments, the specimen sample bin 10 holds multiple vials 14. In other embodiments, the specimen sample bin 10 may hold a single vial 14. In the illustrated example, the vial 14 may be any type of suitable container, including glass or plastic vials. The vial 14 may contain, for example, medication, vaccinations, chemicals or other liquids, gases, solids, or any other suitable specimen. In other embodiments, assets may be different, and a container for the assets may be different, e.g., the assets may be petri dishes stored within a sample holder. The RFID tag 18 on the vial 14 may be any type of active or passive RFID tag. In the example embodiment shown, the RFID tag 18 has a rectangular form factor and is adhered to a vial 14 by an adhesive. In other examples, the RFID tag 18 has a shape corresponding to a shape other than a rectangle, such as a triangle, a circle, or some other shape. In other examples, the RFID tag 18 may have other, irregular, or specialized form factors, such as a luggage tag form factor wherein the RFID tag is able to be wound around a portion of an asset and adhered to itself or the asset. In other examples, the RFID tag 18 may be specialized to be adhered to a particular asset, e.g., to a narrow or irregular portion of an asset, or to be looped through or tied to a portion of the asset. In other examples, the form factor of the RFID tag 18 is that of an adhesive tape, having one or more adhesive surfaces or adhesive portions of surfaces. In other examples, the form factor may be smaller (e.g., so as to fit into narrow or tight areas of an asset) or larger (e.g., so as to be clearly visible on large assets), and may comprise additional or different mechanisms for adhering or affixing to assets.

Each of the RFID tag 18 and the RFID/RF tag 20 may be an active RFID tag or a passive RFID tag, according to some embodiments. An active RFID tag has an internal power source for transmitting a unique identifier stored in memory. A passive RFID tag may not include an internal power source and may respond to a radio frequency (RF) interrogation signal by transmitting the unique identifier stored in a memory device embedded in the tag. The specimen sample bin 10 also includes a RFID/RF tag 20 adhered to a side wall 19 of the specimen sample bin 10. In the example embodiment of FIG. 1A, the RFID/RF 20 tag is adhered to a side wall 19 of the specimen sample bin 10 by an adhesive. In other examples, the RFID/RF tag 20 may instead or additionally be affixed to the specimen sample bin 10 using, for example, a specialized form factor, a luggage tag, or another means, as described previously in conjunction with the RFID tag 18. The RFID/RF tag 20 includes an RFID circuit and a radio frequency (RF) circuit. In some examples, the radio frequency (RF) circuit is a Bluetooth® Low Energy communications circuit.

Figure 1B:
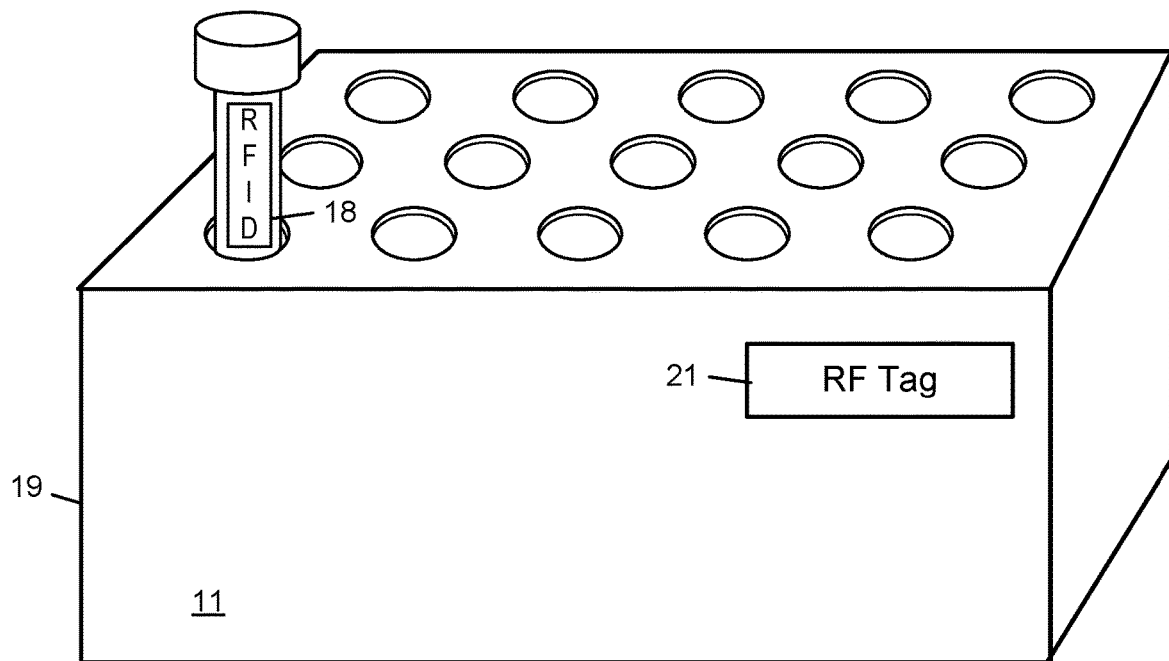

FIG. 1B shows a diagrammatic perspective view of a specimen sample bin 11 that is identical to the specimen sample bin 10 (shown in FIG. 1), except the RFID/RF tag 20 that is adhered to the specimen sample bin 10 has been replaced by an RF tag 21 (e.g., a Bluetooth® LE communications tag wireless tag).

Figure 2:
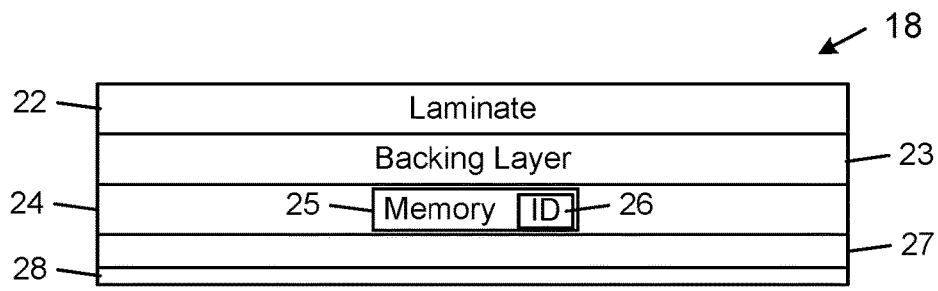
FIG. 2 is a cross-sectional diagram of an example RFID tag, according to some embodiments.

FIG. 2 shows a diagrammatic cross-sectional view of an example of the RFID tag 18 shown in FIGS. 1A and 1B. The RFID tag 18 includes a cover 22, which may be formed of a RFID printer compatible laminate. The cover 22 may be laminated to a backing layer 23. The backing layer 23 is disposed over the RFID circuit layer 24, which includes a memory device 25 that stores a unique radio frequency identifier 26. The circuit layer 24 is disposed over an adhesive layer 27, which positioned over a release layer 28. The release layer 28 may be removably adhered to the bottom surface of the adhesive layer.

In some embodiments, the form factor of the RFID tag 18 and/or of the RFID/RF tag 20 is a flexible adhesive tape platform comprising a flexible polymer layer encapsulating one or more electronic components (as discussed further in FIGS. 3A-3B) of the wireless tag, so as to enable the application of bending, torqueing, pressing, or other forces that may be applied to the flexible adhesive tape platform. For example, as in the luggage tag form factor, the flexible form factor may be bent along an axis to adhere to itself, e.g., around a wire, cord, lever, or handle of an asset. The flexible adhesive tape platform may further comprise one or more flexible film layers having reflective surfaces or reflective surface coatings and/or paper substrates. Example compositions for flexible film layers include polymer films, such as polyester, polyimide, polyethylene terephthalate (PET), and other plastics. The flexible adhesive tape platform may further comprise one or more pressure-sensitive (e.g., silicon-based) adhesive layers or flexible epoxy layers. In other examples, other compositions and layers may be used, e.g., insulating layers or materials, colored layers or materials, light-reflective layers or materials, light-absorbing layers or materials, and/or light-emitting coatings, layers, or materials. In some embodiments, one or more layers of the form factor are adhered together, e.g., the form factor comprises a first adhesive layer between the cover 22 and the backing layer 23, and further comprises a second adhesive layer between the backing layer 23 and the RFID circuit layer 24 of the RFID tag 18 and/or the RFID/RF tag 20.

Figure 3A:
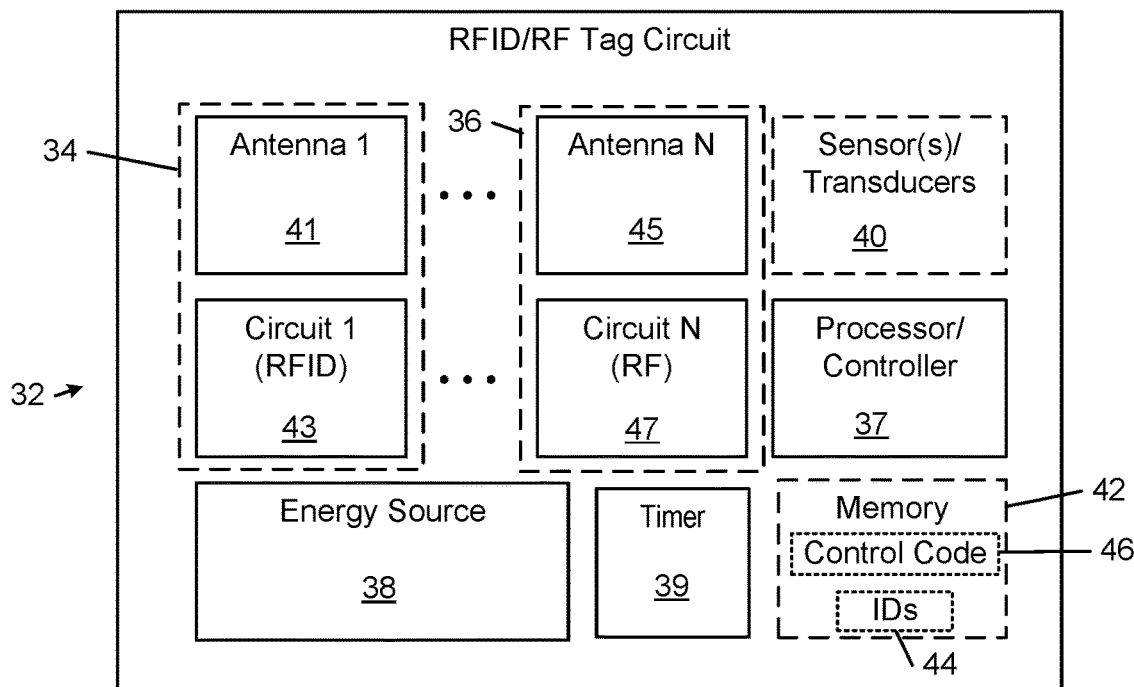
FIG. 3A is a schematic view of RFID/RF tag components of an example wireless transducer circuit, according to some embodiments.

FIG. 3A shows a block diagram of the components of an example RFID/RF tag circuit 32 that includes two or more wireless communications systems 34, 36. One or more of the RFID tag 18 and the RFID/RF tags 20 and 21 shown in FIGS. 1A, 1B, and 2 may include one or more embodiments of the RFID/RF tag circuit 32. For example, the RFID tag circuit 32 may be disposed in the RFID/RF tags 20, 21 shown in FIGS. 1A and 1B, according to some embodiments. Example communication systems 34, 36 include a GPS system that includes a GPS receiver circuit 38 (e.g., a receiver integrated circuit) and a GPS antenna 41, and one or more wireless communication systems each of which includes a respective transceiver circuit 47 (e.g., a transceiver integrated circuit) and a respective antenna 45. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless tag circuit 32 also includes a processor 37 (e.g., a microcontroller or microprocessor), one or more energy storage devices 38 (e.g., non-rechargeable or rechargeable printed flexible battery, conventional single or multiple cell battery, and/or a super capacitor or charge pump), one or more transducers 40 (e.g., sensors and/or actuators, and, optionally, one or more energy harvesting transducer components). Example communications systems include an RFID communications system 34 and an RF communications system 36. Example RF communication systems include a Bluetooth® communication system (e.g., a Bluetooth® Low Energy system), a Z-wave communication system, a ZigBee communication system, and a LoRa communication system. The RFID/RD tag circuit 32 also includes a processor 37 (e.g., a microcontroller or microprocessor), one or more energy storage devices 38 (e.g., non-rechargeable or rechargeable printed flexible battery, conventional single or multiple cell battery, and/or a super capacitor or charge pump), a timer 39, and one or more transducers 40 (e.g., sensors and/or actuators, and, optionally, one or more energy harvesting transducer components). In some examples, the conventional single or multiple cell battery may be a watch style disk or button cell battery that is electrically connected to an electrical terminal structure (e.g., a metal clip) that electrically connects the electrodes of the battery to contact pads on the wireless tag circuit 32. Some embodiments also include a GPS system that includes a GPS receiver circuit (e.g., a receiver integrated circuit) that determines the current location of the RFID/RF tag circuit 32.

Examples of sensing transducers 40 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 50 include light emitting components (e.g., light emitting diodes and displays), electro-acoustic transducers (e.g., audio speakers), electric motors, and thermal radiators (e.g., an electrical resistor or a thermoelectric cooler).

In some examples, the RFID/RF tag circuit 32 includes a memory 42 for storing data, including, e.g., profile data, state data, event data, sensor data, localization data, security data, and one or more unique identifiers (IDs) 44 associated with the RFID/RF Tag circuit 32, such as a product ID, a type ID, and a media access control (MAC) ID, and control code 46 that includes instructions executable by the processor 36 to perform one or more tasks autonomously. The one or more unique IDs may include a globally unique identifier associated with the RFID/RF tag circuit, according to some embodiments. In some examples, the memory 42 may be incorporated into one or more of the processors 36 or transducers 50 or may be a separate component that is integrated in the RFID/RF tag circuit 32. The control code 46 typically is implemented as programmatic functions or program modules that control the operation of the RFID/RF tag circuit 32, including a node communication manager that manages the manner and timing of tape node communications, a node power manager that manages power consumption, and a node connection manager that controls whether connections with other nodes are secure connections (e.g., connections secured by public key cryptography) or unsecure connections, and a node storage manager that securely manages the local data storage on the RFID/RF tag circuit 32. In some examples, a node connection manager (not shown) ensures the level of security required by the end application and supports various encryption mechanisms. In some examples, a node power manager and communication manager (not shown) work together to optimize the battery consumption for data communication. In some examples, execution of the control code by the different types of nodes described herein may result in the performance of similar or different functions.

Figure 3B:
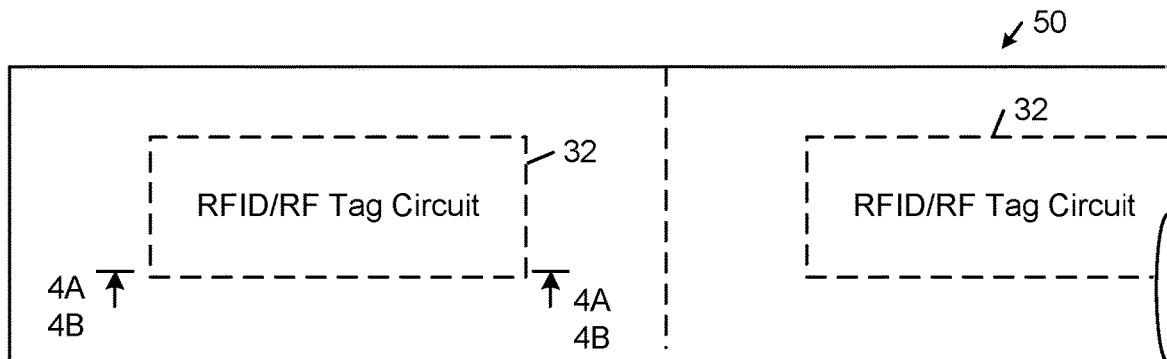
FIG. 3B is a diagrammatic top view of multiple segments of an example wireless tag platform containing respective embedded wireless transducing circuits, according to some embodiments.

FIG. 3B is a top view of a tape platform 50. The tape platform 50 includes multiple segments, each segment including a respective set of the components of the RFID/RF tag circuit 32. In some embodiments, multiple segments contain respective sets of components that are identical and configured in the same way. In some other embodiments, however, multiple segments contain respective sets of components that are different and/or configured in different ways. For example, different ones of the segments have different sets or configurations of tracking and/or transducing components in their respective RFID/RF tag circuit 32 that are designed and/or optimized for different applications. Alternatively, different sets of segments of the platform 50 may have different ornamentations (e.g., markings on the exterior surface of the platform) and/or different dimensions.

An example method of fabricating the tape platform 50 according to a roll-to-roll fabrication process is described in connection with FIGS. 6, 7A, and 7B of U.S. patent application Ser. No. 15/842,861, filed Dec. 14, 2017, now U.S. Pat. No. 10,262,255, the entirety of which is incorporated herein by reference.

The instant specification describes an example system of wireless tags and adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 4A:
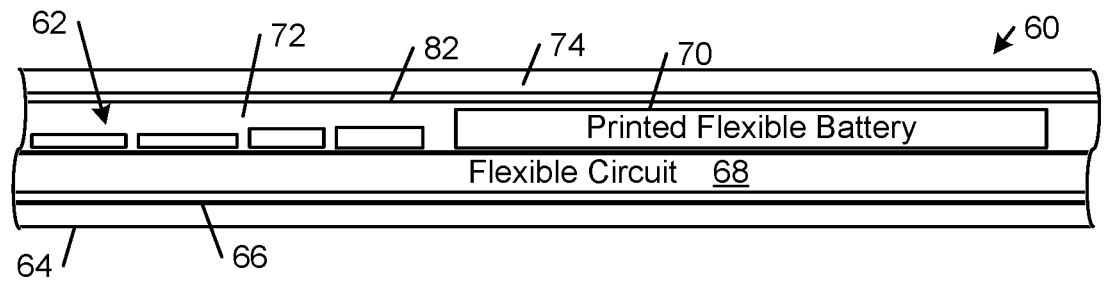
FIG. 4A is a diagrammatic cross-sectional side view of a wireless tag that includes a printed flexible battery, according to some embodiments.

FIG. 4A shows a cross-sectional side view of a portion of a segment of a wireless tag 60 that includes tracking components 62. The components 62 may include one or more embodiments of the RFID/RF tag circuit 32 shown in FIGS. 3A and 3B. The wireless tag segment 60 includes a flexible substrate 64 with an adhesive layer on its top surface and an optional adhesive layer on its bottom surface. If the bottom adhesive layer is present, a release liner (not shown) may be (removably) adhered to the bottom surface of the adhesive layer. The adhesive layer 66 bonds the flexible substrate 64 to a bottom surface of a flexible circuit 68 that includes one or more wiring layers (not shown) that connect a processor, a circuit (e.g., a wireless receiver circuit, wireless transmitter circuit, or wireless transceiver circuit), an antenna, and other components (e.g., one or more sensors) in the device layer to each other and to the flexible battery 70 and, thereby, enable the tracking and other functionalities of the tracking adhesive product segment 60. A flexible polymer layer 72 encapsulates the device layer and thereby reduces the risk of damage that may result from the intrusion of contaminants and/or liquids (e.g., water). The flexible polymer layer 72 also planarizes the device layer, which distributes forces generated in, on or across the tracking adhesive product segment 60 so as to reduce potentially damaging asymmetric stresses that might be caused by the application of bending, torqueing, pressing, or other forces on the tracking adhesive product segment 231. A flexible cover 74 is bonded to the planarizing polymer 84 by an adhesive layer 82.

In some embodiments, the flexible polymer layer 72 may comprise one or more flexible film layers having reflective surfaces, reflective surface coatings, and/or paper substrates. Example compositions for the flexible polymer layer 72 comprise, for example, polyester, polyimide, polyethylene terephthalate (PET), and other plastics. The flexible adhesive tape platform may further comprise one or more pressure-sensitive (e.g., silicon-based) adhesive layers or flexible epoxy layers. In other examples, other compositions and layers may be used, e.g., insulating layers or materials, colored layers or materials, light-reflective layers or materials, light-absorbing layers or materials, and/or light-emitting coatings, layers, or materials. In some embodiments, one or more layers or components of the wireless tag 60 may be rigid such that the adhesive tape platform is fully rigid or rigid along one or more axes. In some embodiments, the wireless tag 60 may comprise modules or portions that are mechanically or chemically affixed or adhered together and may be removeable, e.g., a module comprising the flexible battery 70 or other components.

Figure 4B:
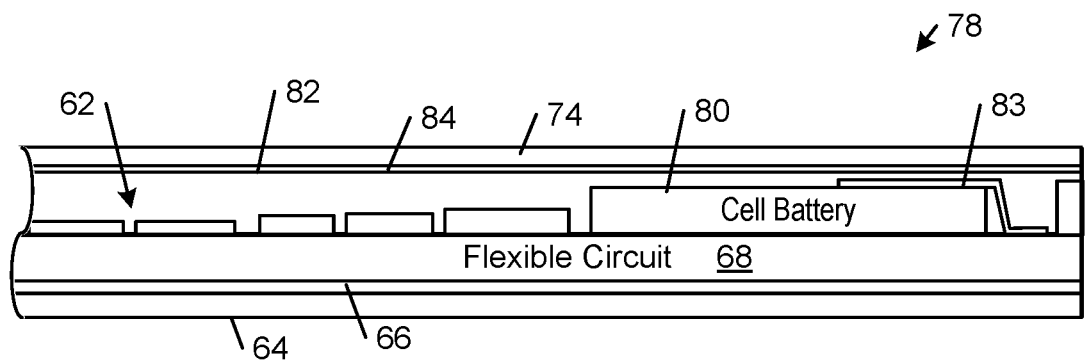
FIG. 4B is diagrammatic cross-sectional side view of a wireless tag that includes a cell battery, according to some embodiments.

FIG. 4B shows a cross-sectional side view of an alternative example 78 of the segment of the wireless tag 78 shown in FIG. 4A. The only difference between this alternative example 78 and the example 60 shown in FIG. 4A is that the flexible battery 70 has been replaced by a conventional single or multiple cell battery 80 (e.g., a watch style disk or button cell battery) and associated electrical connection apparatus 83 (e.g., a metal clip) that electrically connects the electrodes of the battery 80 to contact pads on the flexible circuit 68. In alternative examples, a segment of a wireless tag 78 may additionally or instead comprise removable batteries or batteries that may be recharged using a wireless or wired connection.

Figure 5:
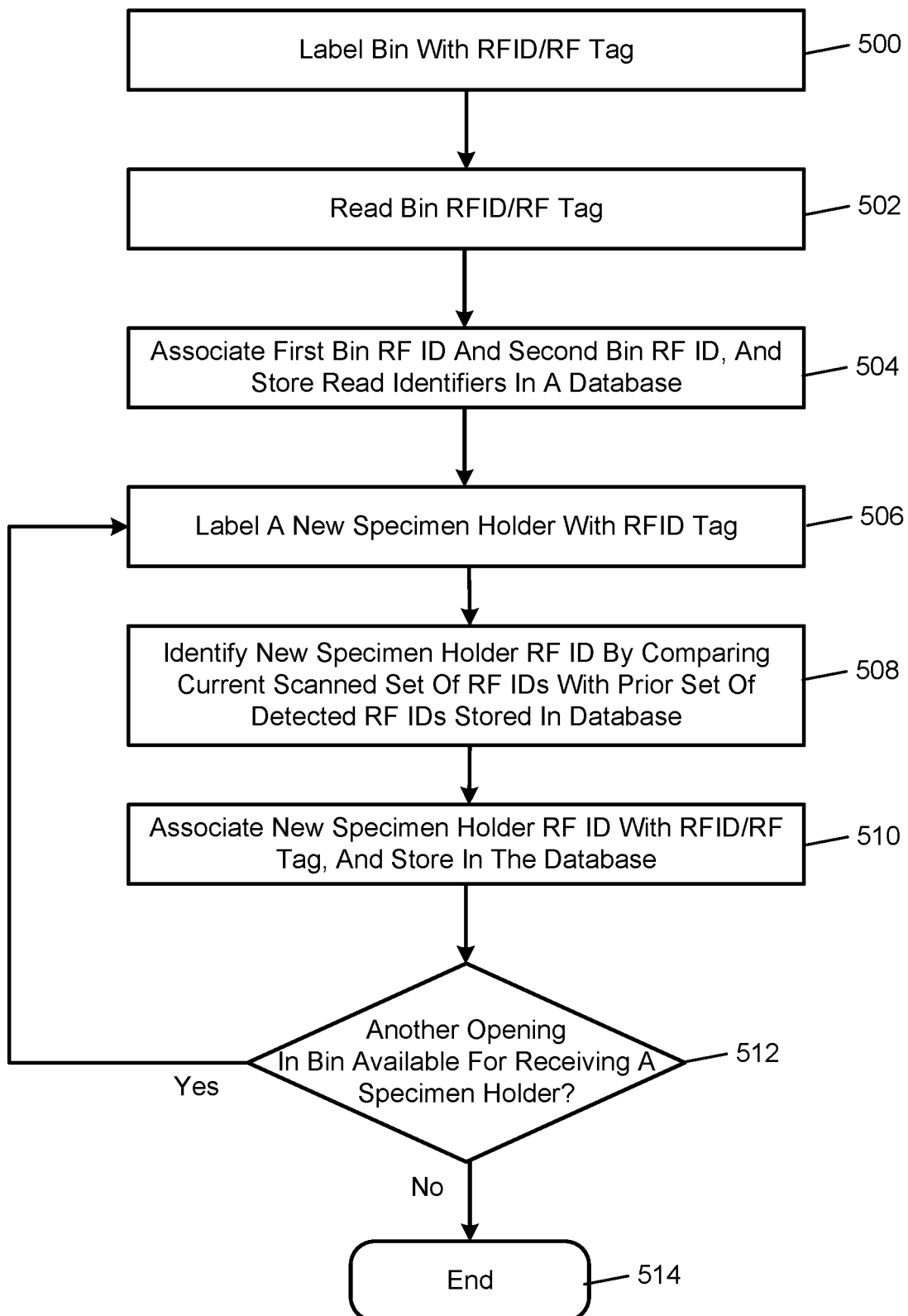
FIG. 5 is a flow diagram of a method of labeling specimen holders and a specimen holder bin with unique identifiers, according to some embodiments.

FIG. 5 is a flow diagram of a process of labeling specimen holders (e.g., vials) and a specimen holder bin 10, 11 with globally unique identifiers as the specimen holders are being loaded into the slots of the bin 10, 11. The process includes labeling the bin with an RFID/RF tag by adhering or attaching an embodiment of a RFID/RF tag 20 to the bin 10, 11 (FIG. 5, block 500). In some embodiments, the RFID/RF tag has an adhesive layer that attaches the RFID/RF tag to the bin. In other embodiments as discussed in conjunction with FIG. 1, other methods of adhering or attaching the RFID/RF tag to the bin may be used, e.g., a luggage tag form factor. The bin RFID/RF tag is read by an RFID/RF scanner to obtain a first bin RF identifier and a second bin RF identifier from the encoded the RFID/RF tag (FIG. 5, block 502). The first bin identifier may be a RFID identifier. The second bin RF identifier is a different identifier from the first bin RF identifier. In some embodiments, the second bin RF identifier (RF ID) is a unique identifier of a communication interface of the RFID/RF tag. For example, the second bin RF identifier may be a unique identifier of a Bluetooth communication interface of the RFID/RF tag. In some embodiments, the first bin RF identifier and the second bin RF identifier are each globally unique. The RF scanner associates the first bin RF identifier with the second bin RF identifier and stores the correlated identifiers and their association in a database (FIG. 5, block 504).

The process continues by labeling a new specimen holder with a RFID tag by attaching or adhering the RFID tag to the specimen holder (FIG. 5, block 506). In some embodiments, the RFID tag on the specimen holder has a globally unique RF identifier. The RFID tag on the specimen holder is identified by the RF scanner by comparing a current set of scanned RFID tags including the new specimen holder with a preceding set of RFID tags that have been read and stored in the database (FIG. 5, block 508). Assuming all of the RFID tags previously deployed have been scanned at some point in time, the newly deployed RFID tag will be the RFID tag that does not match any of the RFID tags in the prior set of scanned RFID tags. Next, the RFID/RF scanner associates the RF identifier of the RFID tag on the new specimen holder with the identifiers of the RFID/RF tag affixed to the bin and stores the associations in the database (FIG. 5, block 510). If there is an opening in the specimen holder bin for receiving a new specimen holder, the process continues by labeling a new specimen holder with a globally unique RFID tag and inserting the new specimen holder into an open slot in the bin (FIG. 5, block 512). The system executing the process may determine that there is an open slot by counting the number of specimen holders (based on the RF identifiers of their respective RFID tags) associated with the bin and comparing the number with a number of total slots in the bin. If the current bin is filled, the process of storing specimen holders in the current bin is terminated (FIG. 5, block 514).

In other embodiments, the RFID/RF scanner only reads the first bin RF identifier. In this case, the system associates each specimen holder RF identifier of specimen holders loaded into the bin with the first bin RF identifier.

Figures 6, 7:
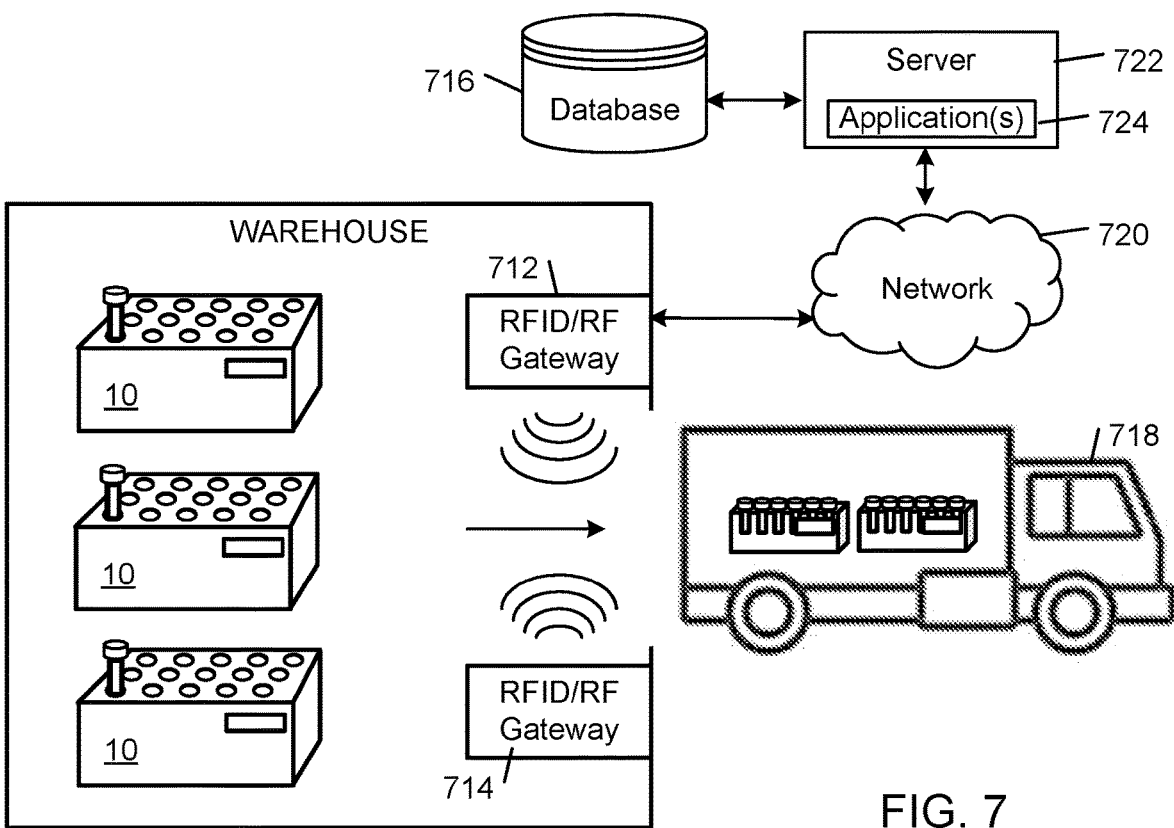
FIG. 6 is a diagrammatic view of correlated specimen holder and bin identifier entries in a database, according to some embodiments.
FIG. 7 is a diagrammatic view of bins of vials being loaded into a vehicle after passing through an RFID/RF gateway, according to some embodiments.

FIG. 6 shows a diagrammatic view of a database 610 that contains globally unique correlated specimen holder (vial) and bin identifier entries in a database. In an embodiment, the identifier entries are read and entered into the database using the method discussed in conjunction with FIG. 5, e.g., by an RF scanner. In the illustrated embodiment, the database 610 shows an example set of vial RF IDs (e.g., RFID A001, RFID A002, . . . RFID A015) correlated with a globally unique first bin RFID identifier (e.g., RFID B001) and a globally unique second bin RF identifier (e.g., BLEID C001) that is associated with Bin 1. In other embodiments, additional or other information may be stored in the database 610, and the information may be formatted differently. For example, the database 610 may additionally identify one or more of: a starting destination associated with a specimen holder and/or a bin; an ending destination associated with a specimen holder and/or a bin; one or more ambient conditions required by a specimen holder and/or bin; and the like. In another example, the database 610 may additionally identify related or linked specimen holder bins, e.g., if multiple bins contain similar assets, require similar conditions, or are being transported to a same destination. According to some embodiments, corresponding information including associated bin RF identifiers and vial RF identifiers for additional bins (e.g., specimen holder bin 2) and specimen holders may be stored in the database 610 for tracking each bin and their associated specimen holders.

FIG. 7 shows a warehouse containing items to be shipped. In the illustrated embodiment, the items are packages each containing one or more logistic items (e.g., bins of specimen vials). Each bin is associated with a globally unique first bin RF identifier and a globally unique second bin RF identifier, as discussed previously in conjunction with FIG. 6.

Each asset within the respective bin is associated with an RFID/RF tag or RF tag. The RFID/RF tag or RF tag of each asset is associated with a corresponding first bin RF identifier or second bin RF identifier for the corresponding bin. In some embodiments, the items may further comprise, for example, a wireless tag comprising one or more sensors capturing data describing an environment of the items. In another example, the items may further comprise wireless tags configured to communicate to servers or networks 720 of the wireless tracking system or other wireless tags in the environment via other communications interfaces.

The warehouse environment comprises one or more RFID/RF gateways 712, 714. In embodiments, the one or more RFID/RF gateways are deployed throughout the warehouse environment such that assets cannot leave an area of the warehouse environment (e.g., a storage area, the warehouse building, etc.) without encountering an RFID/RF gateway. In other embodiments, the one or more RFID/RF gateways may be deployed differently, e.g., based on a most likely trajectory through the warehouse environment. When the items pass through a set of RFID/RF gateways 712, 714, each item is scanned by one or both of the RFID/RF gateways 712, 714 to ascertain the wireless tag identifiers of all the bins and vials that are that are loaded into a vehicle 718. In an embodiment, the gateways 712, 714 transmit the identifiers of the scanned bins and vials over a network 720 to a server 722, which is configured to access a database 716 and to detect if there are any missing bins or any vials that are missing from a bin or if there are any additional bins or vials that are not listed in the database 716. In this process, the server application 724 compares the bin and vial IDs that were entered into the database 714 as the vials were initially loaded into the bins with the bin and vial IDs that are scanned by the RFID/RF gateways 712, 714. If the server application 724 does not detect all of the vials or bins that were listed in the database, or if the server application 724 detect the identifiers of any vials or bins that are not listed in the database 716, the server application 724 is configured to raise an alarm.

In an embodiment, the server application 724 transmits the alarm or notification to a client device of a user of the application or of the wireless tracking system. The alarm or notification may be, for example, a text message or phone call notification transmitted to a mobile phone or computing device. The alarm or notification may comprise information identifying an event (e.g., whether a vial or bin was not detected or whether an extraneous or unlisted vial or bin was detected) and may additionally comprise information describing a vial or bin associated with the event such that the erroneous vial or bin may be identified, located, and addressed quickly by a user of the wireless tracking system. The alarm or notification may prompt a human operator to inspect one or more of the items associated with the RF identifier that triggered the alarm.

In general, the items being tracked are not limited to bins and specimen vials. Instead, any type of asset, item, object, package, container, vehicle, animal, and any other thing that can be tagged can be tracked and located by the systems and methods described herein.

Figure 8A:
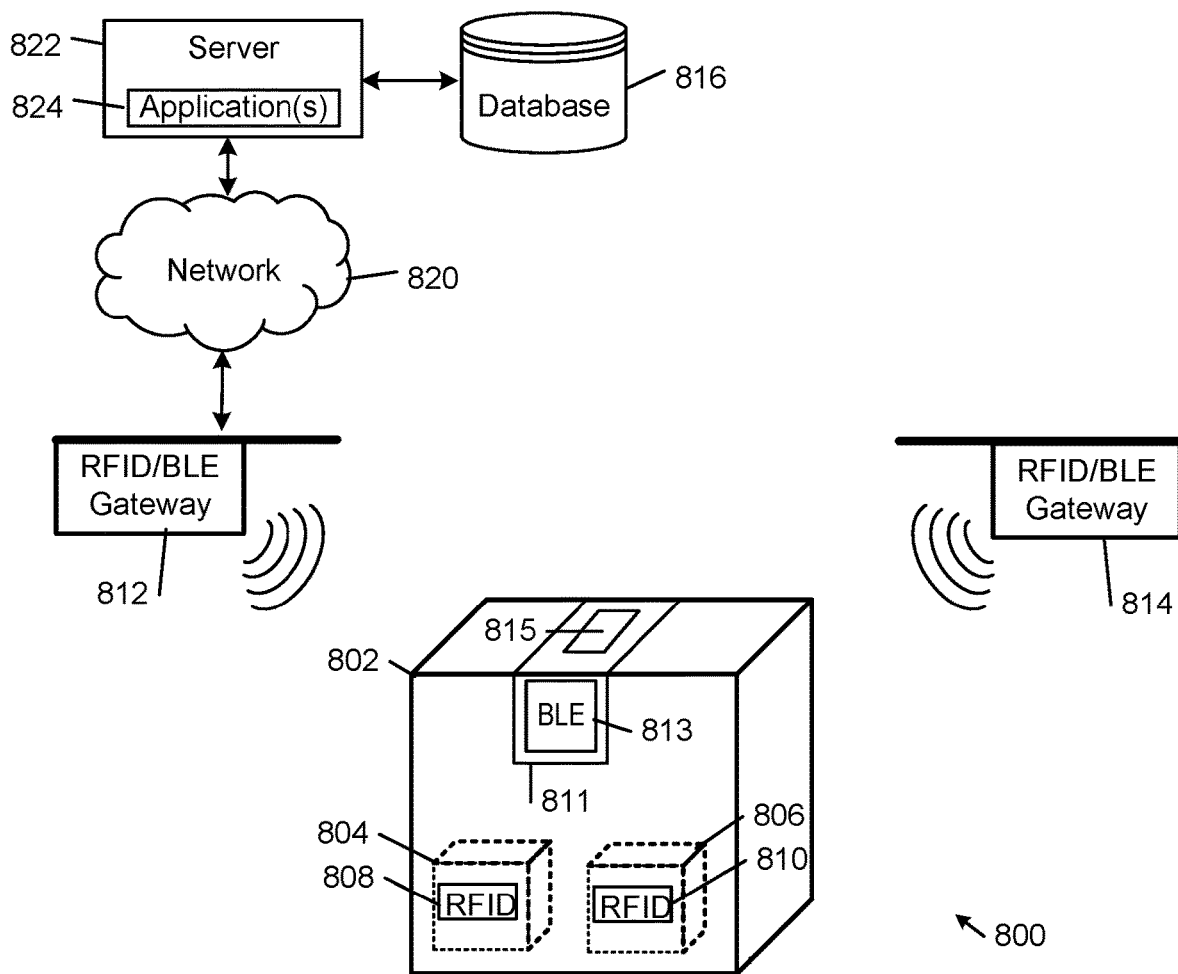
FIG. 8A is a schematic diagram of a package passing through an RFID/RF gateway operable to read and correlate asset identifiers, according to some embodiments.

FIG. 8A shows an example system 800 for reading and correlating identifiers relating to a package 802. In the illustrated embodiment, the package 802 contains multiple logistic containers 804, 806 (e.g., boxes) that are marked with respective RFID tags 808, 810, where each of the containers 804, 806 holds one or more assets. Although only two example containers 804, 806 are shown in FIG. 8A, the package 802 may contain a different number of containers (e.g., more than two), according to some embodiments. In the illustrated embodiment, the package 802 is sealed with an adhesive tape product 811 that includes an embedded wireless Bluetooth® Low Energy (BLE) communications component 813 and an embedded RFID component 815. As the package 802 passes between a set of RFID/RF gateways 812, 814, each adhesive tape product 811 of the package 802 and RFID tag 808, 810 of the boxes 804, 806 is scanned by one or both of the RFID/RF gateways 812, 814 to ascertain the wireless tag identifiers of all the packages 802 and boxes 804, 806 that pass between the gateways.

In other embodiments, the boxes 804, 806 are carried on a pallet or other container (not shown), instead of being contained in the package 802. In these embodiments, a RFID/RF tag 20 (FIG. 1A) or a RF tag 21 (FIG. 1B) is affixed to the pallet or other container and RFID tags 18 are affixed to the packages 804, 806. In some embodiments, a single RFID/RF tag or a RF tag is used to identify the logistic container in or on which are grouped logistic entities that are individually labeled with RFID tags.

In the illustrated embodiment, the RF scanner components of the gateways 812, 814 are implemented by a Bluetooth® Low Energy (BLE) communications devices. The gateways 812, 814 are operable to read and correlate the scanned RFID and BLE identifiers stored in the memories of the RFID/BLE tags. The gateways 812, 814 transmit the identifiers of the scanned packages and boxes over a network 720 to a server 722, which is operable to detect if there are any packages or boxes that are missing and detect if there are any additional packages or boxes that are not listed in the database 716. In this process, the server application 724 compares the identifiers (IDs) of the packages and boxes that were entered into the database 714 as the boxes were initially loaded into the packages with the package and box IDs that are scanned by the RFID/RF gateways 812, 814. If the server application 724 does not detect all of the vials or bins that were listed in the database, or if the server application 724 detects any unknown identifiers of any boxes or packages that are not listed in the database 716, the server application 724 is operable to raise an alarm.

Figure 8B:
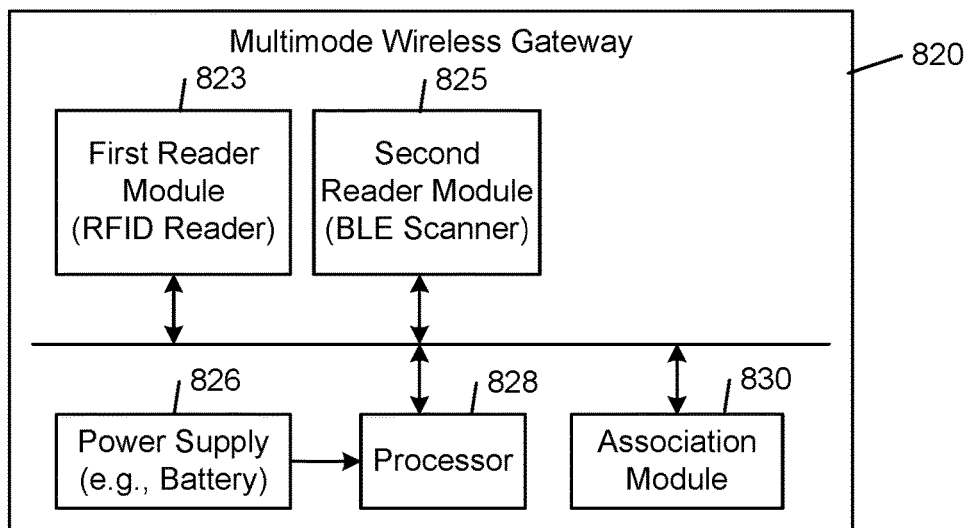
FIG. 8B is a block diagram of example components of the multimode wireless scanner device shown in FIG. 8B and an example database storing associations between correlated identifiers, according to some embodiments.

In some embodiments, one or both of the RFID/BLE gateways 812, 814 are implemented by a multimode wireless gateway 820 of the type shown in FIG. 8B. The gateway 820 includes a first reader module 823 (e.g., RFID scanner) and a second reader module 825 (e.g., RF scanner, e.g., BLE scanner). The multimode wireless gateway 820 also includes a power supply 826 (e.g., a battery), a processor 828, and an association module 830.

The first reader module 823 may be, for example, a RFID reader module that is configured to interrogate the RFID tag 815 of the adhesive tape product 11 on the package 802 and the RFID tags 808, 810 on the boxes 804, 806 within the package 802. The RFID tags 815, 808, 810 may be configured with a fixed packet of read-only data that can be transmitted to a RFID reader (e.g., RFID reader module 823) within range of the RFID tags 815, 808, 810. The RFID tags 815, 808, 810 typically can be reprogrammed with different data, as needed. When the RFID reader module 823 detects a RFID tag 822 that is within range and operates within the same frequency range of the RFID reader module 823, the RFID reader module 2 may read the RFID tag 22. In operation, data is transmitted on modulated radio frequency electromagnetic waves between the RFID reader module 823 and the RFID tags 808, 810, 815. In this process, the RFID reader module 823 transmits an electric or magnetic field that is sensed by the RFID tags 215, 208, 210. In response, the RFID tags 815, 808, 810 transmit data (including a globally unique identification number) that typically is stored in a microchip memory component associated with the RFID tags 815, 808, 810.

In general, the RFID tags 815, 808, 810 may be an active RFID tag or a passive RFID tag. Active RFID tags include local power sources (e.g., batteries) for sending data packets to a RFID reader module. Passive RFID tags, on the other hand, do not require any local power sources to transmit data packets to a RFID reader module; instead, passive RFID tags are powered by inductive or capacitive coupling between the RFID reader module and the RFID tag. In an example, a passive RFID tag is configured to couple to the magnetic fields generated by a RFID reader module. In this regard, each of the RFID reader module and the RFID tag includes a respective set of one or more electrically conducting coils. The RFID reader module uses its power source to generate an electric current in the set of coils to generate magnetic fields that induce a current in the set of coils in the RFID tag. The induced current powers the RFID tag to generate a wireless RFID signal that is transmitted to the RFID reader module. In another example, a passive RFID tag is configured to capacitively couple with a corresponding RFID reader module through capacitive coupling plates. In this process, the RFID reader module generates an alternating electric field that causes the RFID tag to transfer data to the RFID reader module. However, capacitively coupled RFID reader modules and tags can only transfer information across short distances and therefore are typically limited to near-field applications.

The second reader module 825 may be, for example, a wireless RF scanner device that is configured to communicate with the wireless RF tag 813 of the wireless flexible product 811. Example wireless RF scanner devices include a Bluetooth scanner (e.g., a Bluetooth Low Energy scanner), a near field communication (NFC) scanner, a LoRaWAN scanner, and a cellular scanner. In an illustrative embodiment, a Bluetooth Low Energy (BLE) scanner is configured to locate and communicate with BLE adhesive product tags within the scanner's range. In this process, the BLE scanner 824 advertises its presence with a specific authentication identifier and credentials. When a BLE adhesive product tag receives data from the BLE scanner, the BLE adhesive product tag establishes a handshake with the BLE scanner on the corresponding advertisement channel. Then the BLE adhesive product tag hands off communication with the BLE scanner 824 to a data channel (e.g., a BLE data channel). The BLE adhesive product tag learns the BLE scanner's product identification number (PIN) and type identification number (TIN) and transmits that information to a network service to let the network service know that the BLE scanner 824 is communicating with the BLE adhesive product tag. Scanners and peripheral adhesive product tags for LoRaWAN, cellular, ZigBee, and other wireless communications operate in accordance with respective communications protocols.

In some examples, the first reader module 823 and the second reader module 825 are integrated into a single multimode reader device 820 that is operable to perform functions of the RFID/BLE gateways 812, 814. For example, the first reader module 823 and the second reader module 825 may be integrated into an RFID/RF scanning of the type shown in blocks 812, 814 in FIG. 8A to communicate with and read data from the wireless flexible product 811, including the RFID tags 815, 818, 810 on and in the package 802 and the RF tag 813 on the package 802 (i.e., the Bluetooth Low Energy).

Figure 9:
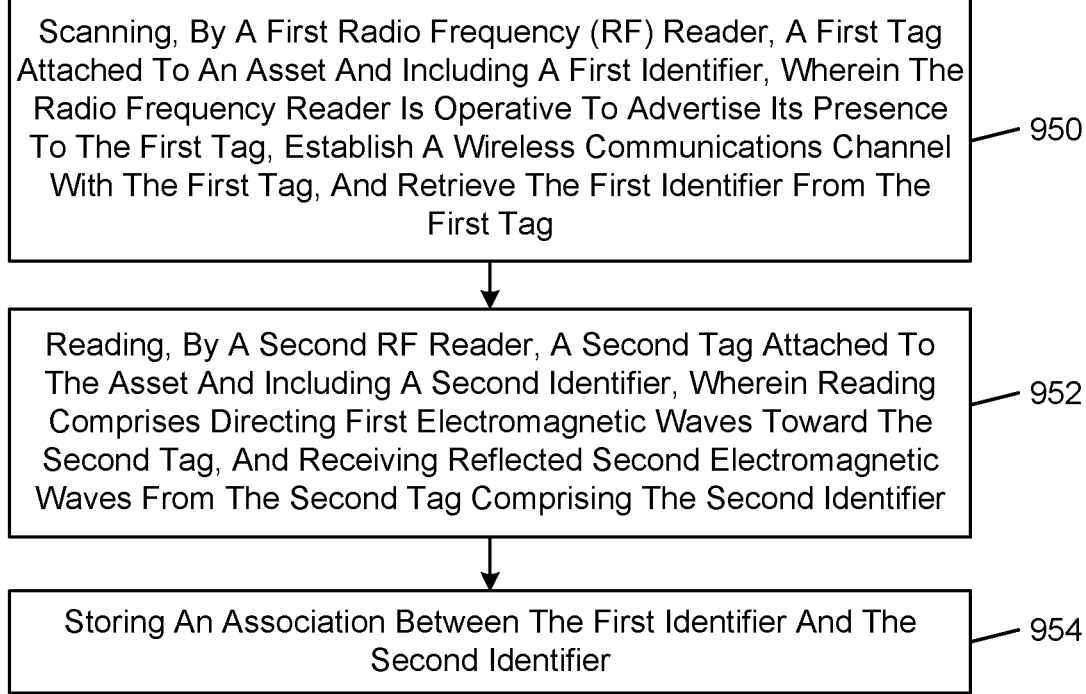
FIG. 9 is an example flow diagram of a process of reading, correlating, and storing asset identifiers, according to some embodiments.

FIG. 9 shows a flow diagram of an example process of associating identifiers for assets having different RFID tags. In an embodiment, in accordance with this process, a radio frequency (RF) reader is directed to read a first tag attached to an asset and including a first identifier (FIG. 9, block 950). The radio frequency reader is directed to advertise its presence to the first tag and establish a wireless communications channel with the first tag to retrieve the first identifier from the first tag. For example, the RF reader transmits an interrogation signal to the first tag. The first tag is configured to, responsive to receiving the interrogation signal, establish a wireless communication channel and transmit a stored first identifier to the RF reader.

A second reader is instructed to read a second tag attached to the asset and including a second identifier (FIG. 9, block 952). In an embodiment, the second RF reader emits a first set of electromagnetic waves directed toward the second tag. The first set of electromagnetic waves result in a second set of reflected electromagnetic waves comprising the second identifier associated with the second tag. In other embodiments, additional or different sources or methods for reading RFID or RF tags may be used.

In some embodiments, the first tag and the second tag are integrated into a single physical entity. For example the first the tag and the second tag may each be integrated into an adhesive tape product, like the adhesive tape product 813 shown in FIG. 8A. In other embodiments, the first tag is physically separate from the second tag. In further embodiments, the first tag is attached to a first asset, and the second tag is attached to a second asset associated with the first asset.

An association between the first identifier and the second identifier is stored predicated on the first tag and the second tag satisfying a temporal or spatial proximity condition (FIG. 9, block 954). For example, the embodiment shown in FIG. 1B includes an RF tag 21 on the bin 11 but does not include a RFID tag on the bin 11. In this embodiment, the bin is identified by the temporal proximity of the read times of the RFID tags on the vials in the bin to the time when the RF tag 21 is read. If the read times are within an empirically determined threshold time difference (e.g., 1-2 seconds), the RFID tags 18 on the vials that are read by the RFID reader are associated with the RF tag on the bin 11 that is scanned by the RF scanner component of the gateways 812, 814.

In some examples, the association module 830 component of the multimode wireless gateway 820 determines and transmits respective chains of associations between the different identifiers in one or more tables of the database 816 shown in FIG. 8A. The tables may be used by an asset management application 824 to track assets, monitor the status or state of a particular asset, and report the status and condition of an asset. In some embodiments, the association database 816 includes a table of identifiers organized in a set of rows. Each row of identifiers is associated with a respective asset. For example, row 1 may correspond to the identifiers that are associated with asset 1, and row 2 corresponds to the identifiers that are associated with asset 2, and so on. Each row of associated identifiers enables the supplier, for example, to generate a report of the location, status, and condition of the associated asset as the asset travels through a logistics network by associating, for example, a transmitted RFID data packet with the identifier of the corresponding wireless flexible product.

Figure 10:
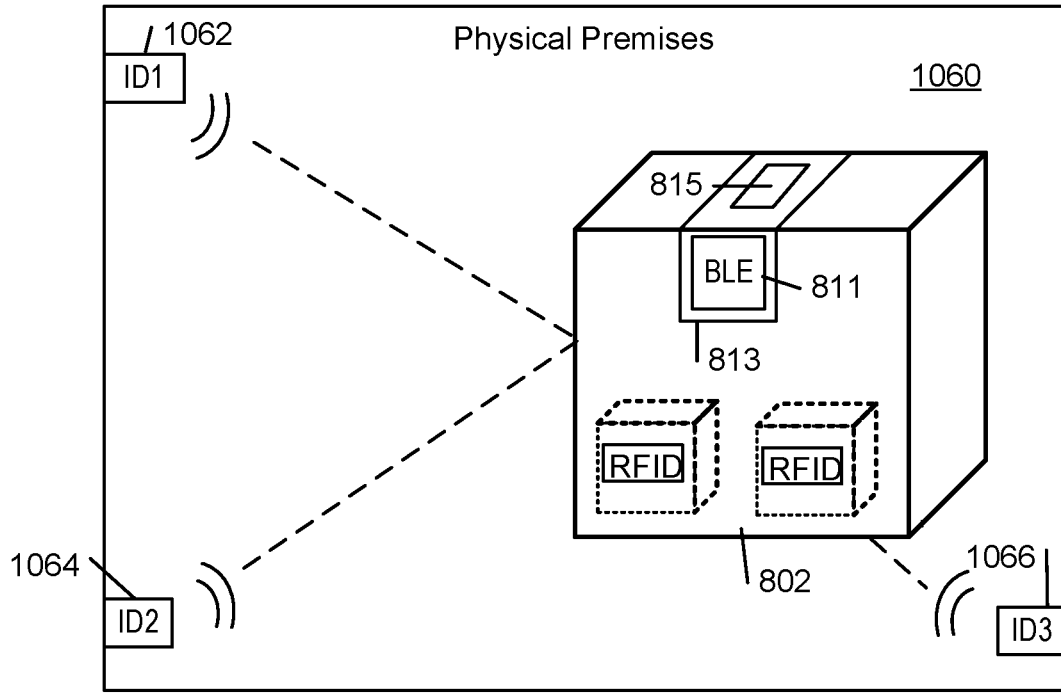
FIG. 10 is an example physical premises environment, according to some embodiments.

Referring to FIG. 10, in some embodiments, an RF wireless tag (e.g., the BLE tag 811) executes coded instructions that includes a mode of operation in which the RF wireless tag 813 transmits advertising packets into the physical premises environment 1060 and receives reply signals from infrastructure wireless tags 1062, 1064, 1066 with unique identifiers (i.e., ID1, ID2, and ID3) and respective signal strengths (e.g., RSSI). For example, in some examples, the RF wireless tag 813 on the package 802 can transmit the advertising packets in the physical premises environment 1060 and receive reply packets from wireless tags 1062, 1064, 1066 in the environment 1060. The RF wireless tag 813 includes coded instructions to triangulate its location relative to the locations of the wireless tags 1062, 1064, 1066 from measurements of signal strength of the beacon signals being transmitted by the infrastructure wireless tags 1062, 1064, 1066 from different locations in the environment. In some embodiments, the received signal strength indicator (RSSI) is used as a measure of the power present in a received radio signal, where the received RSSI power level corresponds to respective distances between the BLE tag 813 and the wireless tags 1062, 1064, 1066 in the physical premises environment 1060.

In other embodiments, other measures of wireless signal strength may be used, including, for example, time-of-flight and time-of-arrival measures. In other embodiments, the RF wireless tag 813 may further receive or capture other data associated with the physical premises environment 1060, e.g., environment data via one or more sensors. Further, in other embodiments, other entities in the physical premises environment 1060 may perform one or more of the computing processes to triangulate or otherwise determine a location associated with the RF wireless tag 813 (and the corresponding package 802). For example, in an embodiment, the RF wireless tag 813 is configured to transmit measurements of signal strength of the beacon signals to an infrastructure wireless tag 1062, 1064, 1066. The infrastructure wireless tag 1062, 1064, 1066 may perform a triangulation to determine the location of the RF wireless tag 813, or may further transmit the received measurements to a server or cloud of the wireless tracking system to perform the computation. In some embodiments, the entity responsible for performing the location determination is selected based on, for example, available computational resources, energy levels associated with a battery of the entities, or the like.

Deployment of Tape Nodes

Figure 11:
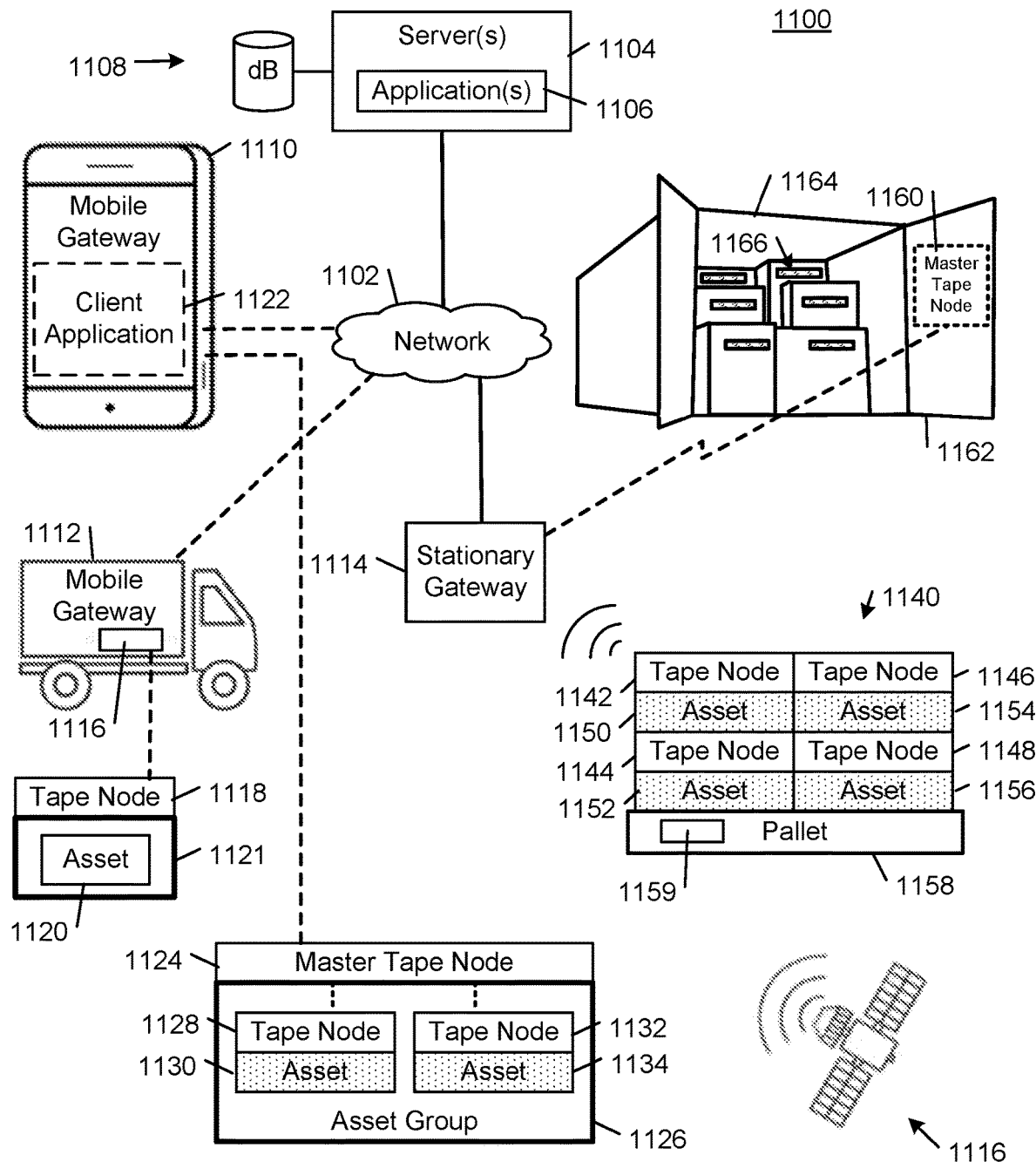
FIG. 11 is a diagrammatic view of an example of a network environment supporting communications with segments of an adhesive tape platform, according to some embodiments.

FIG. 11 shows an example network communications environment 1100 that includes a network 1102 that supports communications between one or more servers 1104 executing one or more applications of a network service 1108, mobile gateways 1110, 1112, a stationary gateway 1114, and various types of tape nodes that are associated with various assets (e.g., parcels, equipment, tools, persons, and other things). The example network communication environment 1100 may also be referred to as a wireless tracking system 1100. In an embodiment, the tape nodes comprise the RFID tags and RF wireless tags as described in conjunction with FIGS. 1-10, or may comprise other types of tape nodes for communicating with the RFID tags and RF wireless tags. The nodes of the wireless tracking system 1100 may refer to the tape nodes, other wireless devices, the gateway devices, client devices, servers, and other components of the wireless tracking system 1100. In some examples, the network 1102 includes one or more network communication systems and technologies, including any one or more of wide area networks, local area networks, public networks (e.g., the internet), private networks (e.g., intranets and extranets), wired networks, and wireless networks. For example, the network 1102 includes communications infrastructure equipment, such as a geolocation satellite system 1116 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 1106 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of wireless tags (e.g., tape nodes) can be configured by the network service 1108 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

In some examples, the one or more network service servers 1104 communicate over the network 1102 with one or more gateways that are configured to send, transmit, forward, or relay messages to the network 1102 and activated tape nodes that are associated with respective assets and within communication range. Example gateways include mobile gateways 1110, 1112 and a stationary gateway 1114. In some examples, the mobile gateways 1110, 1112, and the stationary gateway 1114 are able to communicate with the network 1102 and with designated sets or groups of tape nodes.

In some examples, the mobile gateway 1112 is a vehicle (e.g., a delivery truck or other mobile hub) that includes a wireless communications unit 1116 that is configured by the network service 1108 to communicate with a designated set of tape nodes, including a peripheral tape node 1118 in the form of a label that is adhered to an asset 1120 contained within a parcel 1121 (e.g., an envelope), and is further configured to communicate with the network service 1108 over the network 1102. In some examples, the peripheral tape node 1118 includes a lower power wireless communications interface and the wireless communications unit 1116 is implemented by a tape node that includes a lower power communications interface for communicating with tape nodes within range of the mobile gateway 1112 and a higher power communications interface for communicating with the network 1102. In this way, the tape nodes 1118 and 1116 create a hierarchical wireless network of nodes for transmitting, forwarding, bridging, relaying, or otherwise communicating wireless messages to, between, or on behalf of the peripheral tape node 1118 and the network service 1108 in a power-efficient and cost-effective way.

In some examples, the mobile gateway 1110 is a mobile phone that is operated by a human operator and executes a client application 1122 that is configured by the network service 1108 to communicate with a designated set of tape nodes, including a master tape node 1124 that is adhered to a parcel 1126 (e.g., a box), and is further configured to communicate with the network service 1108 over the network 1102. In the illustrated example, the parcel 1126 contains a first parcel labeled or sealed by a tape node 1128 and containing a first asset 1130, and a second parcel labeled or sealed by a tape node 1132 and containing a second asset 1134. As explained in detail below, the master tape node 1124 communicates with each of the peripheral tape nodes 1128, 1132 and communicates with the mobile gateway 1108 in accordance with a hierarchical wireless network of tape nodes. In some examples, each of the peripheral tape nodes 1128, 1132 includes a lower power wireless communications interface and the master tape node 1124 is implemented by a tape node that includes a lower power communications interface for communicating with the peripheral tape nodes 1128, 1132 contained within the parcel 1126, and a higher power communications interface for communicating with the mobile gateway 1110. The master tape node 1124 is operable to relay wireless communications between the tape nodes 1128, 1132 contained within the parcel 1126 and the mobile gateway 1110, and the mobile gateway 1110 is operable to relay wireless communications between the master tape node 1124 and the network service 1108 over the wireless network 1102. In this way, the master tape node 1124 and the peripheral tape nodes 1128 and 1132 create a hierarchical wireless network of nodes for transmitting, forwarding, relaying, or otherwise communicating wireless messages to, between, or on behalf of the peripheral tape nodes 1128, 1132 and the network service 1108 in a power-efficient and cost-effective way.

In some examples, the stationary gateway 1114 is implemented by a server executing a server application that is configured by the network service 1108 to communicate with a designated set 1140 of tape nodes 1142, 1144, 1146, 1148 that are adhered to respective parcels containing respective assets 1150, 1152, 1154, 1156 on a pallet 1158. In other examples, the stationary gateway 1114 is implemented by a tape node that is adhered to, for example, a wall, column or other infrastructure component of the environment 1100, and includes a lower power communications interface for communicating with tape nodes within range of the stationary gateway 1114 and a higher power communications interface for communicating with the network 1102.

In one embodiment, each of the tape nodes 1142-1148 is a peripheral tape node and is configured by the network service 1108 to communicate individually with the stationary gateway 1114, which relays communications from the tape nodes 1142-1148 to the network service 1108 through the stationary gateway 1114 and over the communications network 1102. In another embodiment, one of the tape nodes 1142-1148 at a time is configured as a master tape node that transmits, forwards, relays, or otherwise communicate wireless messages to, between, or on behalf of the other tape nodes on the pallet 1158. In this embodiment, the master tape node may be determined by the tape nodes 1142-1148 or designated by the network service 1108. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 1159 is adhered to the pallet 1158 and is configured to perform the role of a master node for the tape nodes 1142-1148. In these ways, the tape nodes 1142-1148, 1158 are configurable to create different hierarchical wireless networks of nodes for transmitting, forwarding, relaying, bridging, or otherwise communicating wireless messages with the network service 1108 through the stationary gateway 1114 and over the network 1102 in a power-efficient and cost-effective way.

In the illustrated example, the stationary gateway 1114 also is configured by the network service 1108 to communicate with a designated set of tape nodes, including a master tape node 1160 that is adhered to the inside of a door 1162 of a shipping container 1164, and is further configured to communicate with the network service 1108 over the network 1102. In the illustrated example, the shipping container 1164 contains a number of parcels labeled or sealed by respective peripheral tape nodes 1166 and containing respective assets. The master tape node 1116 communicates with each of the peripheral tape nodes 1166 and communicates with the stationary gateway 1115 in accordance with a hierarchical wireless network of tape nodes. In some examples, each of the peripheral tape nodes 1166 includes a lower power wireless communications interface and the master tape node 1160 is implemented by a tape node that includes a lower power communications interface for communicating with the peripheral tape nodes 1166 contained within the shipping container 1164, and a higher power communications interface for communicating with the stationary gateway 1114.

In some examples, when the doors of the shipping container 1164 are closed, the master tape node 1160 is operable to communicate wirelessly with the peripheral tape nodes 1166 contained within the shipping container 1164. In an example, the master tape node 1160 is configured to collect sensor data from the peripheral tape nodes and, in some embodiments, process the collected data to generate, for example, one or more histograms from the collected data. When the doors of the shipping container 1164 are open, the master tape node 1160 is programmed to detect the door opening (e.g., with an accelerometer component of the master tape node 1160) and, in addition to reporting the door opening event to the network service 1108, the master tape node 1160 is further programmed to transmit the collected data and/or the processed data in one or more wireless messages to the stationary gateway 1114. The stationary gateway 1114, in turn, operable to transmit the wireless messages received from the master tape node 1160 to the network service 1108 over the wireless network 1102. Alternatively, in some examples, the stationary gateway 1114 also is operable to perform operations on the data received from the master tape node 1160 with the same type of data produced by the master node 1159 based on sensor data collected from the tape nodes 1142-1148. In this way, the master tape node 1160 and the peripheral tape nodes 1166 create a hierarchical wireless network of nodes for transmitting, forwarding, relaying, or otherwise communicating wireless messages to, between, or on behalf of the peripheral tape nodes 1166 and the network service 1108 in a power-efficient and cost-effective way.

In some embodiments, the mobile gateways 1110 and/or the stationary gateways 1114 of the wireless tracking system 1100 are RFID/RF gateways 712, 714 as discussed in conjunction with FIG. 7 or are RFID/BLE gateways 812, 814 as discussed in conjunction with FIG. 8A-8B. As such, the mobile gateways 1110 and/or the stationary gateways 1114 are configured to communicate with RFID tags associated with respective assets of the wireless tracking system 1100 during various points of transport, storage, and the like.

In an example of the embodiment shown in FIG. 11, there are three classes of tape nodes: a short range tape node, a medium range tape node, and a long range tape node. The short range tape nodes typically are adhered directly to parcels containing assets. In the illustrated example, the tape nodes 1118, 1128, 1132, 1142-1148, 1166 are short range tape nodes. The short range tape nodes typically communicate with a low power wireless communication protocol (e.g., Bluetooth LE, Zigbee, or Z-wave). The medium range tape nodes typically are adhered to objects (e.g., a box 1126 and a shipping container 1160) that are associated with multiple parcels or assets that are separated from the medium range tape nodes by a barrier or a large distance. In the illustrated example, the tape nodes 1124 and 1160 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 1100. In the illustrated example, the mobile gateway tape node 1112 and the stationary gateway tape node 1114 are long range tape nodes. The long range tape nodes typically communicate with other nodes using a high power wireless communication protocol (e.g., a cellular data communication protocol). In some examples, the mobile gateway tape node 1136 is adhered to a mobile vehicle (e.g., a truck). In these examples, the mobile gateway 1112 may be moved to different locations in the environment 1100 to assist in connecting other tape nodes to the server 1104. In some examples, the stationary gateway tape node 1114 may be attached to a stationary structure (e.g., a wall) in the environment 1100 with a known geographic location. In these examples, other tape nodes in the environment can determine their geographic location by querying the gateway tape node 1114.

Hierarchical Wireless Communications Network

Figure 12:
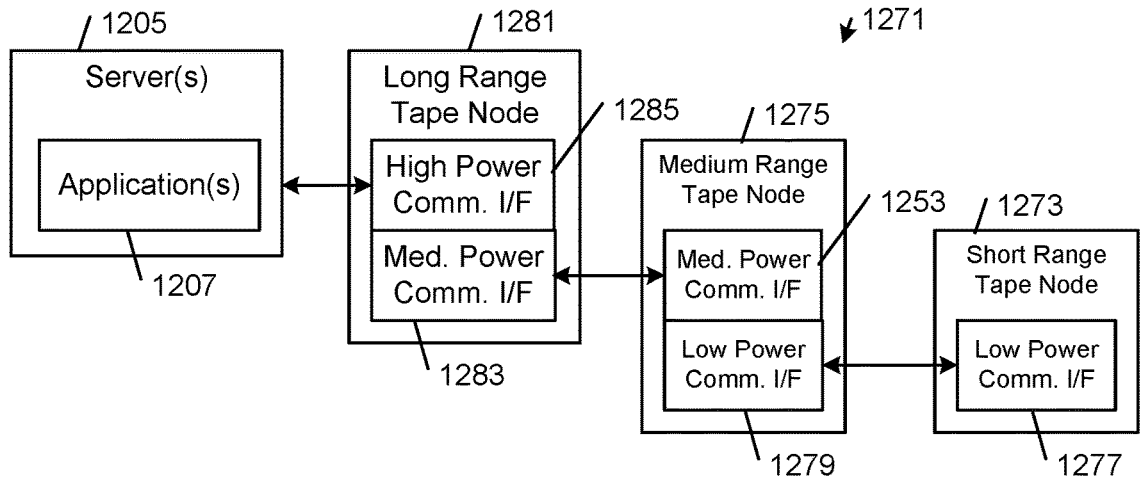
FIG. 12 is a diagrammatic view of a hierarchical communications network, according to some embodiments.

FIG. 12 shows an example hierarchical wireless communications network of tape nodes 1270. In this example, the short range tape node 1272 and the medium range tape node 1274 communicate with one another over their respective low power wireless communication interfaces 1276, 1278. The medium range tape node 1274 and the long range tape node 1280 communicate with one another over their respective medium power wireless communication interfaces 1278, 1282. The long range tape node 1280 and the network server 1204 communicate with one another over the high power wireless communication interface 1284. In some examples, the low power communication interfaces 1276, 1278 establish wireless communications with one another in accordance with the Bluetooth LE protocol, the medium power communication interfaces 1252, 1282 establish wireless communications with one another in accordance with the LoRa communications protocol, and the high power communication interface 1284 establishes wireless communications with the server 1204 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 1204 of the network service 1208 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 1204 of the network service 1208. The schedule usually dictates all aspects of the communication, including the times when particular tape nodes should communicate, the mode of communication, and the contents of the communication. In one example, the server 1204 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 1204, either directly or indirectly through a gateway tape node (e.g., the long range tape node 1216 adhered to the mobile vehicle 1212 or the long range tape node 1214 adhered to an infrastructure component of the environment 1200). In other examples, the master tape node processes the information contained in the received data packets and transmits the processed information to the server network node 1204.

Figure 13:
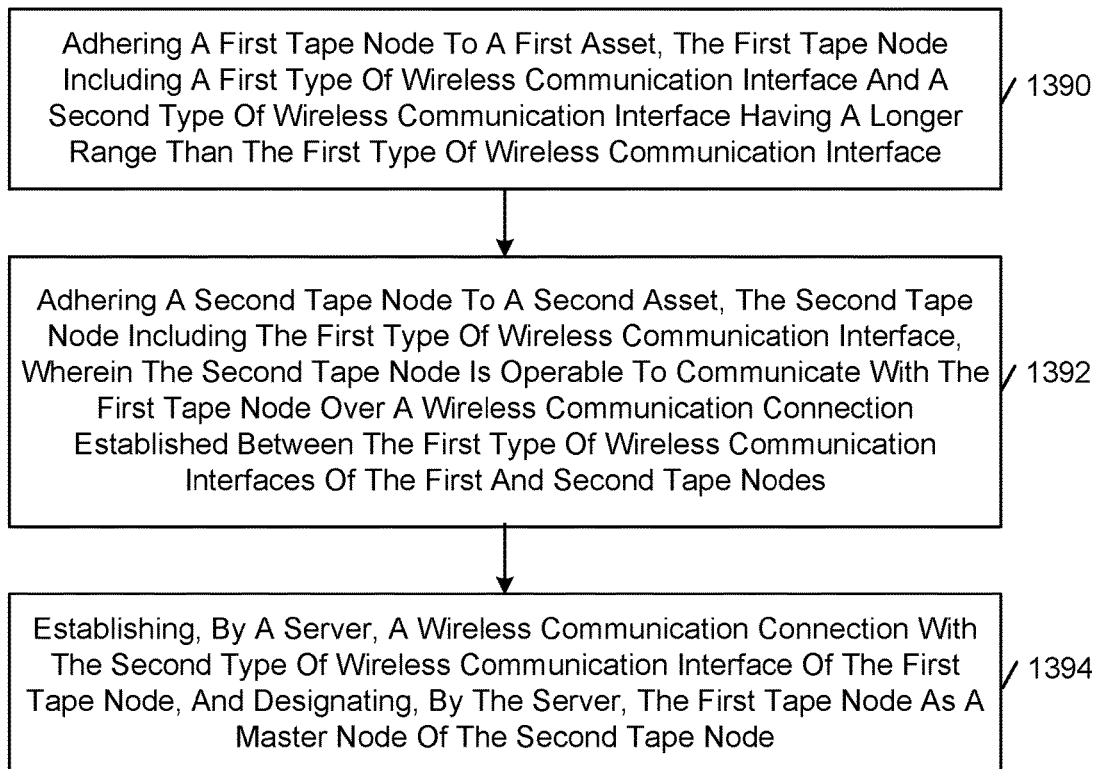
FIG. 13 is a flow diagram of a method of creating a hierarchical communications network, according to some embodiments.

FIG. 13 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 13, block 1390). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 13, block 1392). An application executing on a computer system (e.g., a server 1104 of a network service 1108) establishes a wireless communication connection with the second type of wireless communication interface of the first tape node, and the application transmits programmatic code executable by the first tape node to function as a master tape node with respect to the second tape node (FIG. 13, block 1394).

In some embodiments, the second tape node is assigned the role of the master tape node with respect to the first tape node.

In some embodiments, a hierarchy is established with respect to wireless RFID/RF tags, RF tags, and other wireless tags of the wireless tracking system 1100. For example, in embodiments comprising one or more RFID/RF tags and RF tags, a wireless tag or gateway tape node configured to broadcast an interrogation signal to the one or more RFID/RF tags or RF tags is a master tape node. In some embodiments, there may be one or more master tape nodes. The one or more master tape nodes may be assigned based on having a medium or high communications range as described above, or may be assigned based on other criteria, e.g., being affixed to the infrastructure of a vehicle or building so as to come into contact with or establish communications with a high number of assets. The one or more master tape nodes may receive information from the RFID/RF tags and RF tags responsive to the interrogation signal. In some embodiments, additional or different information may be received, e.g., sensor information describing an environment of a bin, container, or an asset within a container, and the like. The one or more master nodes may communicate the received information to a server or cloud of the wireless tracking system 1100 for processing, and may one or more processes and/or communicate subsets of the received information to the server or cloud of the wireless tracking system 1100 (e.g., identifying and transmitting information describing missing or compromised assets within a bin or container only).

Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 14A:
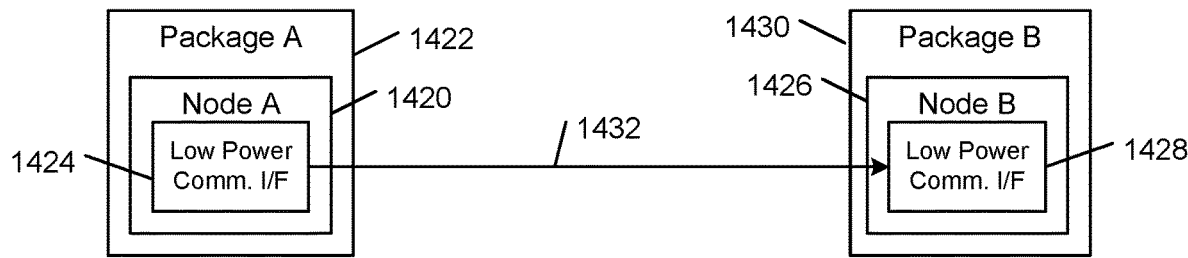
FIGS. 14A-14E are diagrammatic views of exemplary use cases for a distributed agent operating system, according to some embodiments.

Referring to FIG. 14A, a node 1420 (Node A) is associated with a package 1422 (Package A). In some embodiments, the node 1420 may be implemented as a tape node that is used to seal the package 1422 or it may be implemented as a label node that is used to label the package 1422; alternatively, the node 1420 may be implemented as a non-tape node that is inserted within the package 1422 or embedded in or otherwise attached to the interior or exterior of the package 1422. In the illustrated embodiment, the node 1420 includes a low power communications interface 1424 (e.g., a Bluetooth Low Energy communications interface). Another node 1426 (Node B), which is associated with another package 1430 (Package B), is similarly equipped with a compatible low power communications interface 1428 (e.g., a Bluetooth Low Energy communications interface).

In an example scenario, in accordance with the programmatic code stored in its memory, node 1426 (Node B) requires a connection to node 1420 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1420 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1432 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 14B:
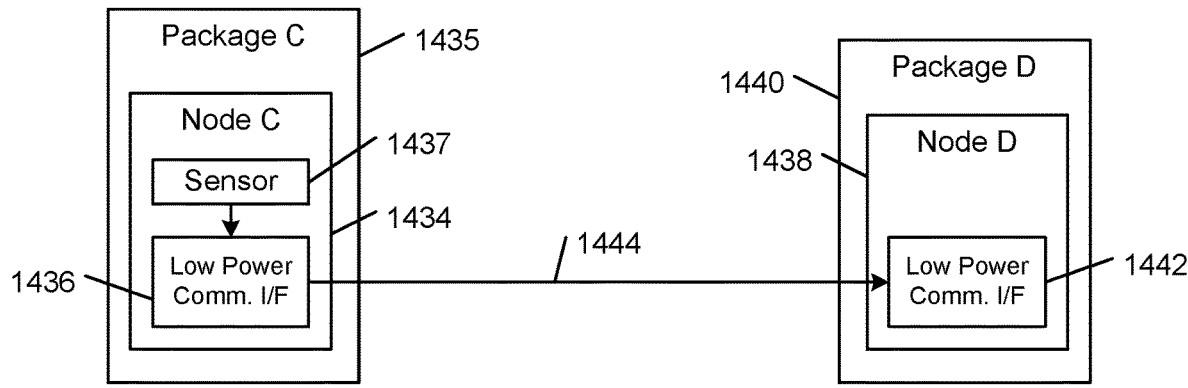

Referring to FIG. 14B, a node 1434 (Node C) is associated with a package 1435 (Package C). In the illustrated embodiment, the Node C includes a low power communications interface 1436 (e.g., a Bluetooth Low Energy communications interface), and a sensor 1437 (e.g., a temperature sensor). Another node 1438 (Node D), which is associated with another package 1440 (Package D), is similarly equipped with a compatible low power communications interface 1442 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1444 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 14C:
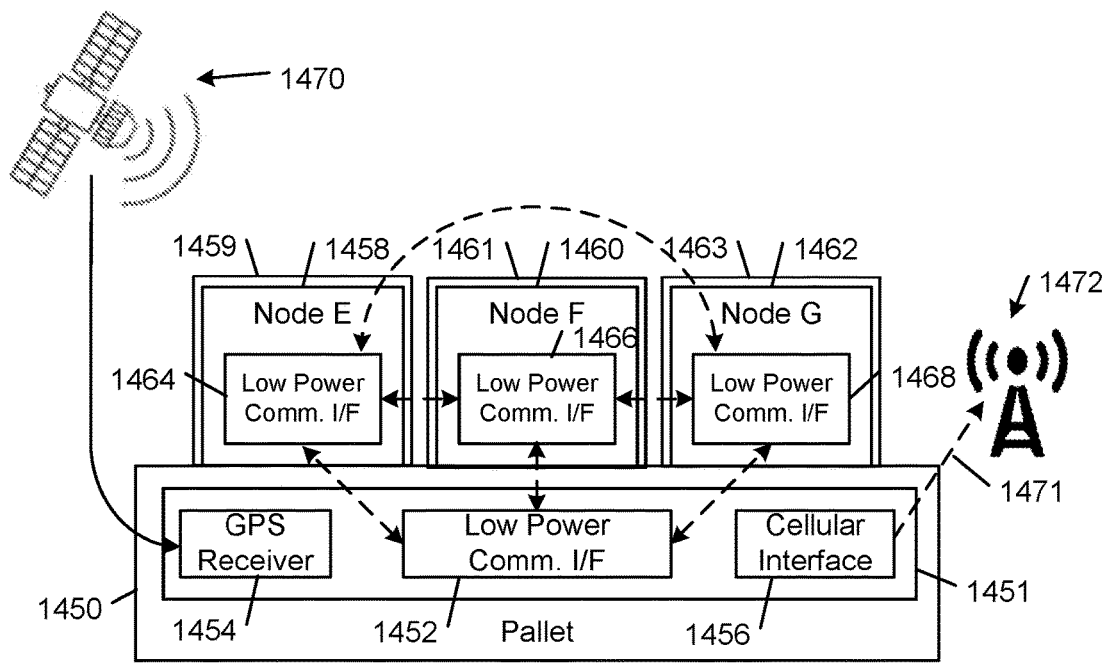

Referring to FIG. 14C, a pallet 1450 or other container or bin is associated with a master node 1451 that includes a low power communications interface 1452, a GPS receiver 1454, and a cellular communications interface 1456. In some embodiments, the master node 1451 may be implemented as a tape node or a label node that is adhered to the pallet 1450.

In other embodiments, the master node 1451 may be implemented as a non-tape node that is inserted within the body of the pallet 1450 or embedded in or otherwise attached to the interior or exterior of the pallet 1450. In other embodiments, the master node 1451 is a wireless tag with RFID/RF or BLE capabilities and is configured to transmit interrogation signals to one or more RFID/RF or RF tags associated with individual assets within the pallet 1450.

The pallet 1450 provides a structure for grouping and containing packages 1459, 1461, 1463 each of which is associated with a respective peripheral node 1458, 1460, 1462 (Node E, Node F, and Node G). In the example of FIG. 14C, packages 1459, 1461, 1463 are not necessarily related, and may have different destinations or be able to withstand different ambient conditions. In other examples, the pallet 1450 is an equivalent to a bin or container as discussed in conjunction with FIG. 1A-1B, wherein assets within the pallet are related and identified using RFID or RF tags. Each of the peripheral nodes 1458, 1460, 1462 includes a respective low power communications interface 1464, 1466, 1468 (e.g., Bluetooth Low Energy communications interface). In the illustrated embodiment, each of the nodes E, F, G and the master node 1451 are connected to each of the other nodes over a respective low power communications path (shown by dashed lines).

In some embodiments as mentioned previously, the packages 1459, 1461, 1463 are grouped together because they are related. For example, the packages 1459, 1461, 1463 may share the same shipping itinerary or a portion thereof. In an example scenario, the master pallet node 1450 scans for advertising packets that are broadcasted from the peripheral nodes 1458, 1460, 1462. In some examples, the peripheral nodes broadcast advertising packets during respective scheduled broadcast intervals. The master node 1451 can determine the presence of the packages 1459, 1461, 1463 in the vicinity of the pallet 1450 based on receipt of one or more advertising packets from each of the nodes E, F, and G. In some embodiments, in response to receipt of advertising packets broadcasted by the peripheral nodes 1458, 1460, 1462, the master node 1451 transmits respective requests to the server to associate the master node 1451 and the respective peripheral nodes 1458, 1460, 1462. In some examples, the master tape node requests authorization from the server to associate the master tape node and the peripheral tape nodes. If the corresponding packages 1459, 1461, 1463 are intended to be grouped together (e.g., they share the same itinerary or certain segments of the same itinerary), the server authorizes the master node 1451 to associate the peripheral nodes 1458, 1460, 1462 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi-package group, the master node 1451 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1458, 1460, 1462 include environmental sensors for obtaining information regarding environmental conditions in the vicinity of the associated packages 1459, 1461, 1463. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1451 can determine its own location based on geolocation data transmitted by a satellite-based radio navigation system 1470 (e.g., GPS, GLONASS, and NAVSTAR) and received by the GPS receiver 1454 component of the master node 1451. In an alternative embodiment, the location of the master pallet node 1451 can be determined using cellular based navigation techniques that use mobile communication technologies (e.g., GSM, GPRS, CDMA, etc.) to implement one or more cell-based localization techniques. After the master node 1451 has ascertained its location, the distance of each of the packages 1459, 1461, 1463 from the master node 1451 can be estimated based on the average signal strength of the advertising packets that the master node 1451 receives from the respective peripheral node. The master node 1451 can then transmit its own location and the locations of the package nodes E, F, and G to a server over a cellular interface connection with a cell tower 1472. Other methods of determining the distance of each of the packages 1459, 1461, 1463 from the master node 1451, such as Received Signal-Strength Index (RSSI) based indoor localization techniques, also may be used.

In some embodiments, after determining its own location and the locations of the peripheral nodes, the master node 1451 reports the location data and the collected and optionally processed (e.g., either by the peripheral nodes peripheral nodes 1458, 1460, 1462 or the master node 1451) sensor data to a server over a cellular communication path 1471 on a cellular network 1472.

In some examples, nodes are able to autonomously detect logistics execution errors if packages that are supposed to travel together no longer travel together, and raise an alert. For example, a node (e.g., the master node 1451 or one of the peripheral nodes 1458, 1460, 1462) alerts the server when the node determines that a particular package 1459 is being or has already been improperly separated from the group of packages. The node may determine that there has been an improper separation of the particular package 1459 in a variety of ways. For example, the associated node 1458 that is bound to the particular package 1459 may include an accelerometer that generates a signal in response to movement of the package from the pallet. In accordance with its intelligent agent program code, the associated node 1458 determines that the master node 1451 has not disassociated the particular package 1459 from the group and therefore broadcasts advertising packets to the master node, which causes the master node 1451 to monitor the average signal strength of the advertising packets and, if the master node 1451 determines that the signal strength is decreasing over time, the master node 1451 will issue an alert either locally (e.g., through a speaker component of the master node 1451) or to the server.

Figure 14D:
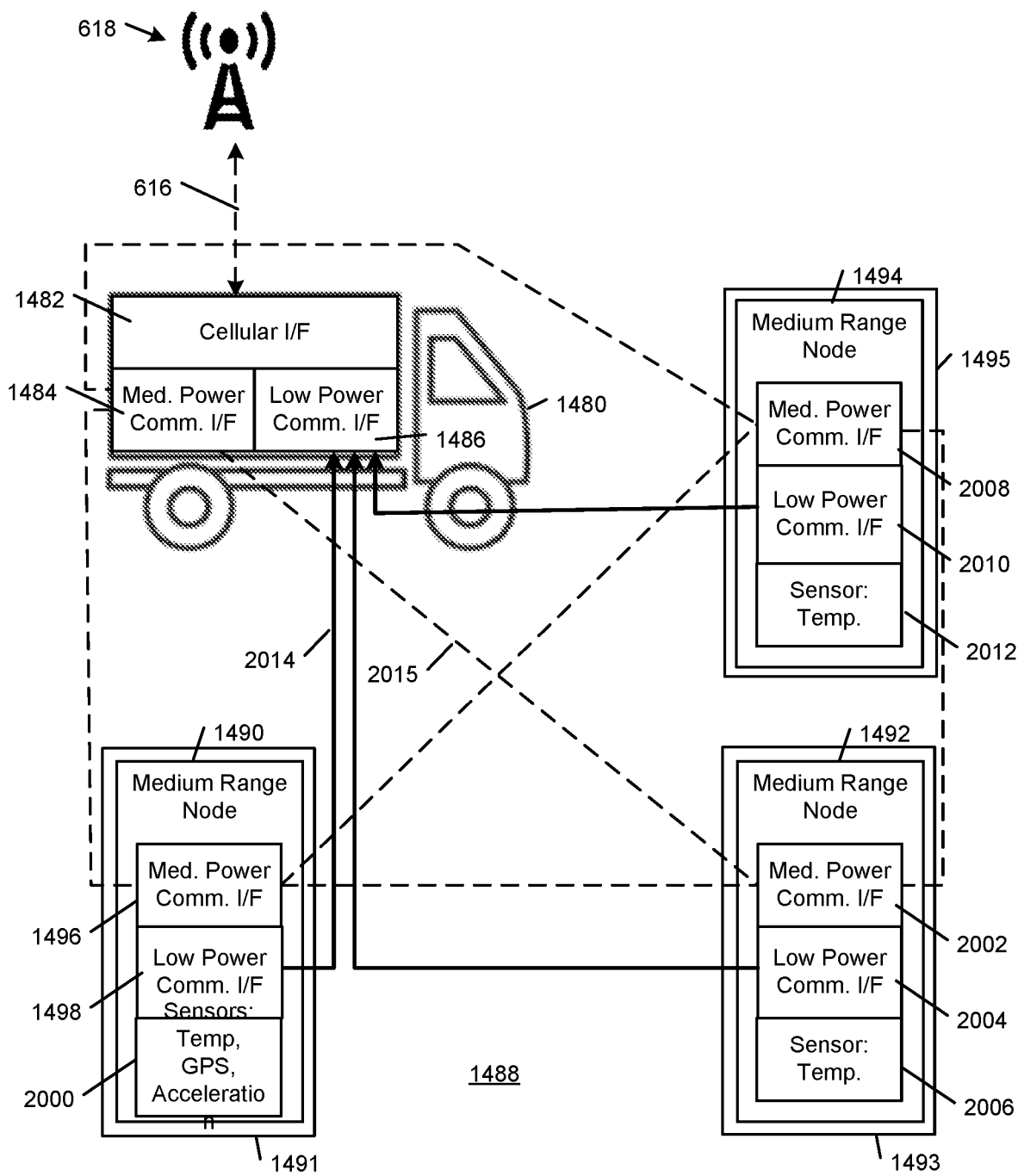

Referring to FIG. 14D, a truck 1480 is configured as a mobile node or mobile hub that includes a cellular communications interface 1482, a medium power communications interface 1484, and a low power communications interface 1486. The communications interfaces 1480-586 may be implemented on one or more tape and non-tape nodes. In an illustrative scenario, the truck 1480 visits a storage facility, such as a warehouse 1488, to wirelessly obtain temperature data generated by temperature sensors in the medium range nodes 1490, 1492, 1494. The warehouse 1488 contains nodes 1490, 1492, and 1494 that are associated with respective packages 1491, 1493, 1495. In the illustrated embodiment, each node 1490-594 is a medium range node that includes a respective medium power communications interface 1496, 2002, 2008, a respective low power communications interface 1498, 2004, 2010 and one or more respective sensors 2000, 2006, 2012. In the illustrated embodiment, each of the package nodes 1490, 1492, 1494 and the truck 1480 is connected to each of the other ones of the package nodes through a respective medium power communications path (shown by dashed lines). In some embodiments, the medium power communications paths are LoRa formatted communication paths.

In some embodiments, the communications interfaces 1484 and 1486 (e.g., a LoRa communications interface and a Bluetooth Low Energy communications interface) on the node on the truck 1480 is programmed to broadcast advertisement packets to establish connections with other network nodes within range of the truck node. A warehouse 1488 includes medium range nodes 1490, 1492, 1494 that are associated with respective containers 1491, 1493, 1495 (e.g., packages, boxes, pallets, and the like). When the truck node's low power interface 1486 is within range of any of the medium range nodes 1490, 1492, 1494 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1490, 1492, 1494, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 2014 or a LoRa formatted communication path 2017), the truck node determines the identity information for the medium range node 1490 (e.g., a peripheral node), the medium range node's capabilities include retrieving temperature data, and the medium range node's services include transmitting temperature data to other nodes. Depending of the size of the warehouse 1488, the truck 1480 initially may communicate with the nodes 1490, 1492, 1494 using a low power communications interface (e.g., Bluetooth Low Energy interface). If any of the anticipated nodes fails to respond to repeated broadcasts of advertising packets by the truck 1480, the truck 1480 will try to communicate with the non-responsive nodes using a medium power communications interface (e.g., LoRa interface). In response to a request from the truck node 1484, the medium range node 1490 transmits an indication of its measured temperature data to the truck node. The truck node repeats the process for each of the other medium range nodes 1492, 1494 that generate temperature measurement data in the warehouse 1488. The truck node reports the collected (and optionally processed, either by the medium range nodes 1490, 1492, 1494 or the truck node) temperature data to a server over a cellular communication path 2016 with a cellular network 2018.

Figure 14E:
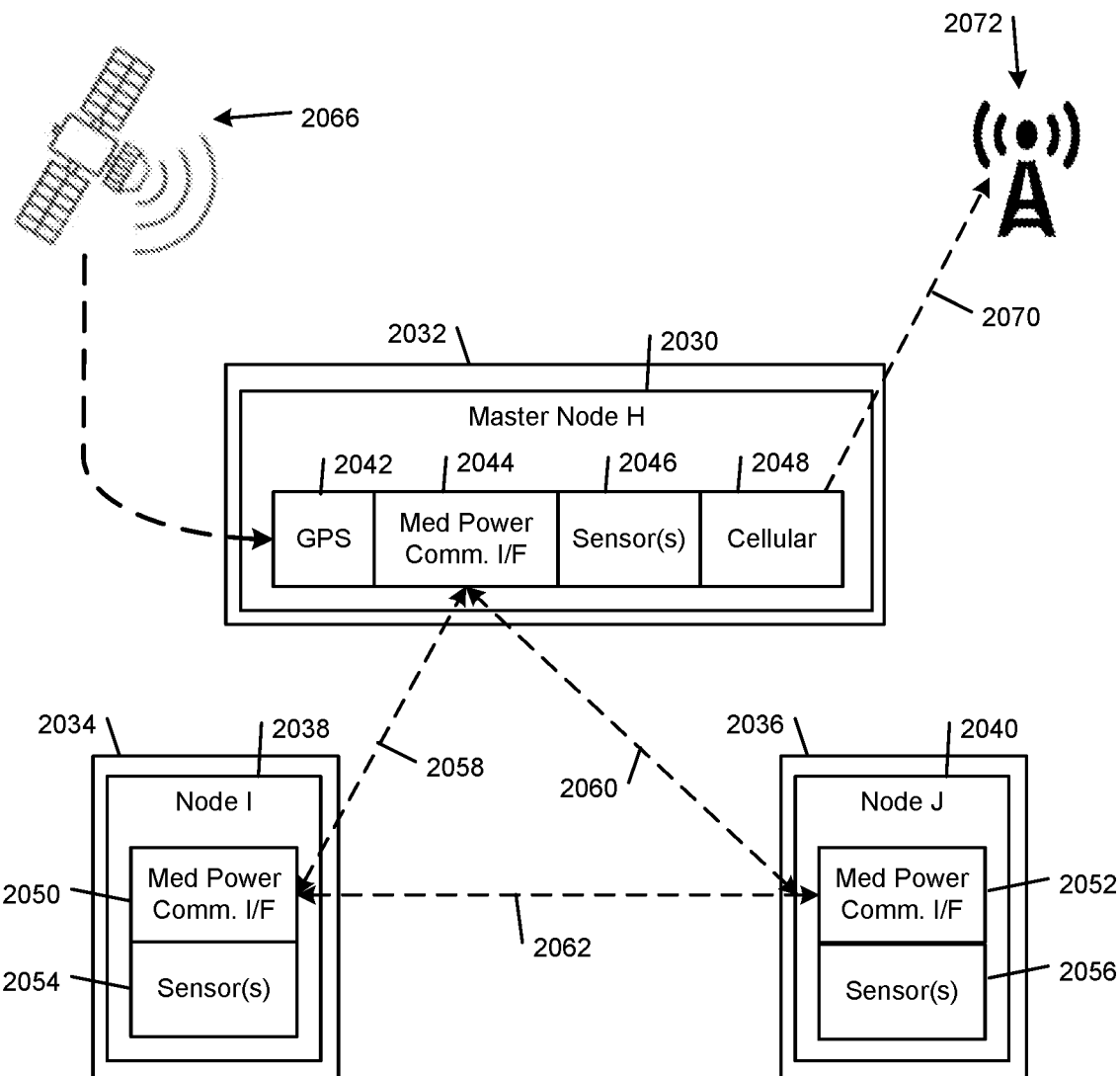

Referring to FIG. 14E, a master node 2030 is associated with an item 2032 (e.g., a package) and grouped together with other items 2034, 2036 (e.g., packages) that are associated with respective peripheral nodes 2038, 2040. The master node 2030 includes a GPS receiver 2042, a medium power communications interface 2044, one or more sensors 2046, and a cellular communications interface 2048. Each of the peripheral nodes 2038, 2040 includes a respective medium power communications interface 2050, 2052 and one or more respective sensors 2054, 2056. In the illustrated embodiment, the peripheral and master nodes are connected to one another other over respective pairwise communications paths (shown by dashed lines). In some embodiments, the nodes 2030 2038, 2040 communicate through respective LoRa communications interfaces over LoRa formatted communications paths 2058, 2060, 2062.

In the illustrated embodiment, the master and peripheral nodes 2038, 2038, 2040 include environmental sensors for obtaining information regarding environmental conditions in the vicinity of the associated packages 2032, 2034, 2036. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 2030 periodically broadcasts advertising packets in the surrounding area. When the peripheral nodes 2038, 2040 are within range of master node 2030, and are operating in a listening mode, the peripheral nodes 2038, 2040 will extract the address of master node 2030 and potentially other information (e.g., security information) from the advertising packets. If, according to their respective programmatic code, the peripheral nodes 2038, 2040 determine that they are authorized to connect to the master node 2030, the peripheral nodes 2038, 2040 will attempt to pair with the master node 2030. In this process, the peripheral nodes 2038, 2040 and the master node and the peripheral nodes determine each other's identities, capabilities, and services. For example, after successfully establishing a respective communication path 2058, 2060 with each of the peripheral nodes 2038, 2040 (e.g., a LoRa formatted communication path), the master node 2030 determines certain information about the peripheral nodes 2038, 2040, such as their identity information (e.g., peripheral nodes), their capabilities (e.g., measuring temperature data), and their services include transmitting temperature data to other nodes.

After establishing LoRa formatted communications paths 2058, 2060 with the peripheral nodes 2038, 2040, the master node 2030 transmits requests for the peripheral nodes 2038, 2040 to transmit their measured and/or locally processed temperature data to the master node 2030.

In the illustrated embodiment, the master node 2030 can determine its own location based on geolocation data transmitted by a satellite-based radio navigation system 2066 (e.g., GPS, GLONASS, and NAVSTAR) and received by the GPS receiver 2042 component of the master node 2030. In an alternative embodiment, the location of the master node 2030 can be determined using cellular based navigation techniques that use mobile communication technologies (e.g., GSM, GPRS, CDMA, etc.) to implement one or more cell-based localization techniques. After the master node 2030 has ascertained its location, the distance of each of the packages 2034, 2036 from the master node 2030 can be estimated based on the average signal strength of the advertising packets that the master node 2030 receives from the respective peripheral node. The master node 2030 can then transmit its own location and the locations of the package nodes E, F, and G to a server over a cellular interface connection with a cell tower 2072. Other methods of determining the distance of each of the packages 2034, 2036 from the master node 2030, such as Received Signal-Strength Index (RSSI) based indoor localization techniques, also may be used.

In some embodiments, after determining its own location and the locations of the peripheral nodes, the master node 2030 reports the location data the collected and optionally processed (e.g., either by the peripheral nodes peripheral nodes 2034, 2036 or the master node 2030) sensor data to a server over a cellular communication path 2070 on a cellular network 2072.

Figure 15A:
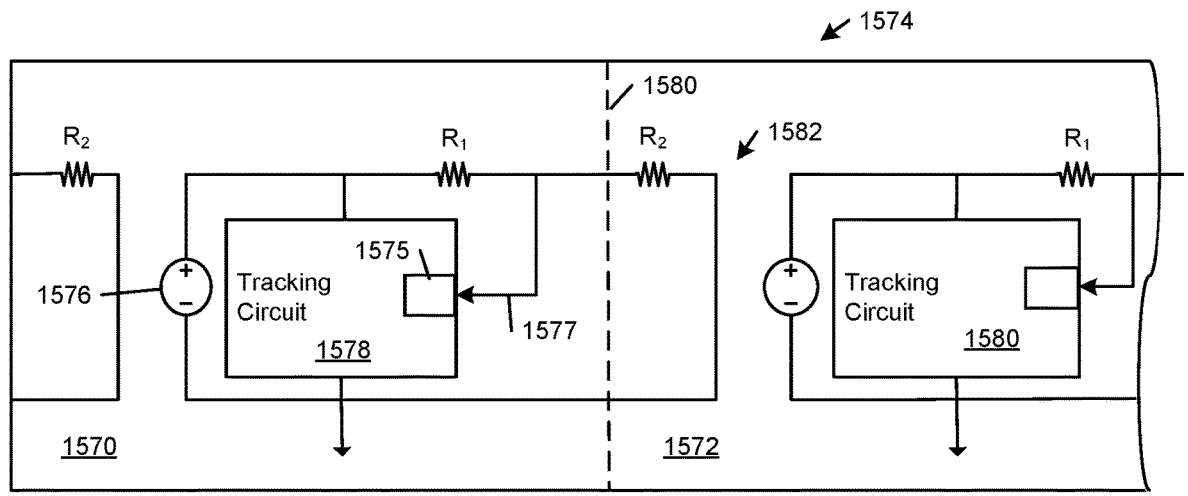
FIG. 15A-15B are diagrammatic top views of a length of an example tracking adhesive product, according to some embodiments.

Referring to FIG. 15A, in some examples, each of one or more of the segments 1570, 1572 of a tracking adhesive product 1574 includes a respective circuit 1575 that delivers power from the respective energy source 1576 to the respective tracking circuit 1578 (e.g., a processor and one or more wireless communications circuits) in response to an event. In some of these examples, the wake circuit 1575 is configured to transition from an off state to an on state when the voltage on the wake node 1577 exceeds a threshold level, at which point the wake circuit transitions to an on state to power-on the segment 1570. In the illustrated example, this occurs when the user separates the segment from the tracking adhesive product 1574, for example, by cutting across the tracking adhesive product 1574 at a designated location (e.g., along a designated cut-line 1580). In particular, in its initial, un-cut state, a minimal amount of current flows through the resistors $R_1$ and $R_2$. As a result, the voltage on the wake node 1570 remains below the threshold turn-on level. After the user cuts across the tracking adhesive product 1574 along the designated cut-line 1580, the user creates an open circuit in the loop 1582, which pulls the voltage of the wake node above the threshold level and turns on the wake circuit 1575. As a result, the voltage across the energy source 1576 will appear across the tracking circuit 1578 and, thereby, turn on the segment 1570. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more of the respective tracking components 1578 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 15B:
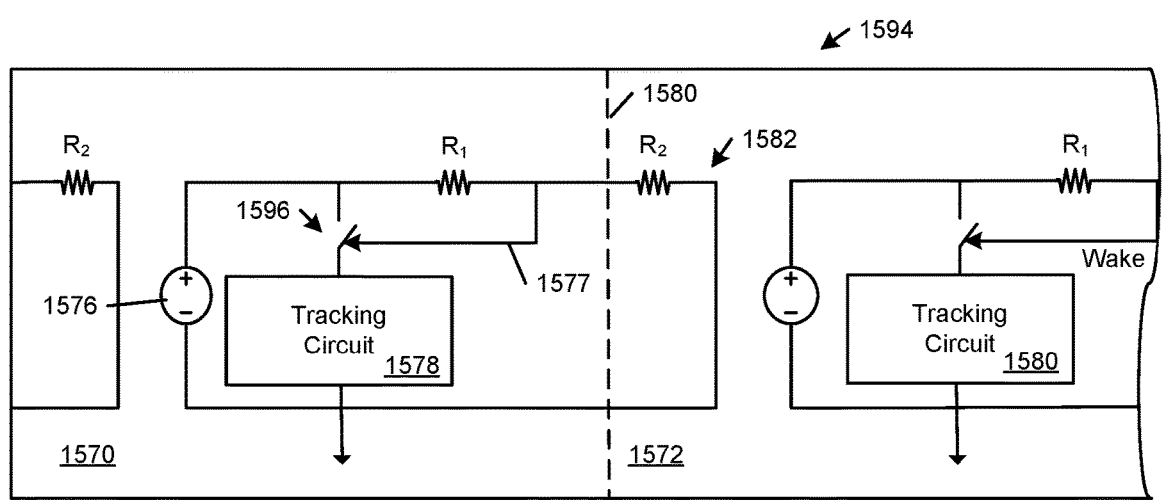

FIG. 15B shows another example of a tracking adhesive product 1594 that delivers power from the respective energy source 1576 to the respective tracking circuit 1578 (e.g., a processor and one or more wireless communications circuits) in response to an event. This example is similar in structure and operation as the tracking adhesive product 1594 shown in FIG. 15A, except that the wake circuit 1575 is replaced by a switch 1596 that is configured to transition from an open state to a closed state when the voltage on the switch node 1577 exceeds a threshold level. In the initial state of the tracking adhesive product 1594, the voltage on the switch node is below the threshold level as a result of the low current level flowing through the resistors $R_1$ and $R_2$. After the user cuts across the tracking adhesive product 1594 along the designated cut-line 1580, the user creates an open circuit in the loop 1582, which pulls up the voltage on the switch node above the threshold level to close the switch 1596 and turn on the tracking circuit 1578.

Exemplary Computer Apparatus

Figure 16:
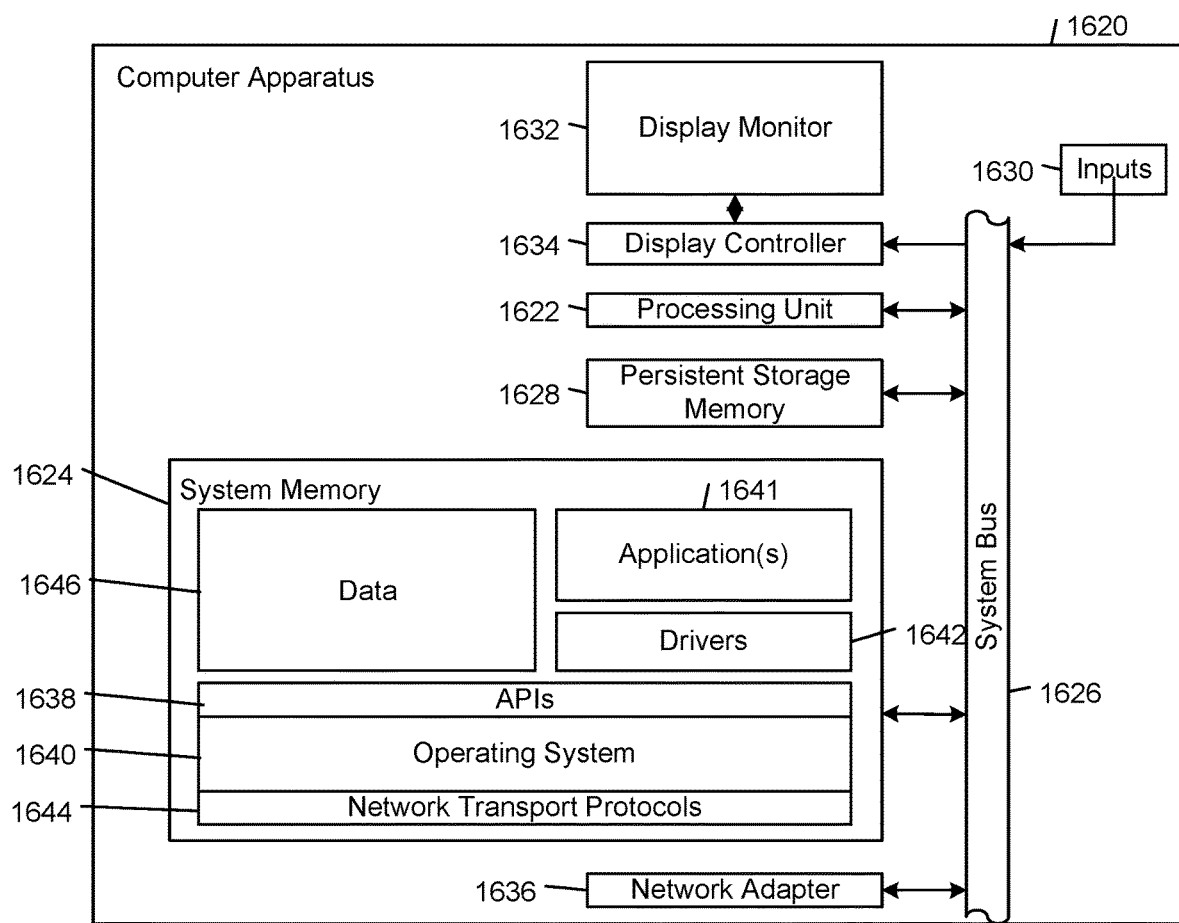
FIG. 16 is a block diagram of an example computer apparatus, according to some embodiments.

FIG. 16 shows an example embodiment of computer apparatus that is configured to implement one or more of the computing systems described in this specification. The computer apparatus 1620 includes a processing unit 1622, a system memory 1624, and a system bus 1626 that couples the processing unit 1622 to the various components of the computer apparatus 1620. The processing unit 1622 may include one or more data processors, each of which may be in the form of any one of various commercially available computer processors. The system memory 1624 includes one or more computer-readable media that typically are associated with a software application addressing space that defines the addresses that are available to software applications. The system memory 1624 may include a read only memory (ROM) that stores a basic input/output system (BIOS) that contains start-up routines for the computer apparatus 1620, and a random access memory (RAM). The system bus 1626 may be a memory bus, a peripheral bus or a local bus, and may be compatible with any of a variety of bus protocols, including PCI, VESA, Microchannel, ISA, and EISA. The computer apparatus 1620 also includes a persistent storage memory 1628 (e.g., a hard drive, a floppy drive, a CD ROM drive, magnetic tape drives, flash memory devices, and digital video disks) that is connected to the system bus 1626 and contains one or more computer-readable media disks that provide non-volatile or persistent storage for data, data structures and computer-executable instructions.

A user may interact (e.g., input commands or data) with the computer apparatus 1620 using one or more input devices 1630 (e.g. one or more keyboards, computer mice, microphones, cameras, joysticks, physical motion sensors, and touch pads). Information may be presented through a graphical user interface (GUI) that is presented to the user on a display monitor 1632, which is controlled by a display controller 1634. The computer apparatus 1620 also may include other input/output hardware (e.g., peripheral output devices, such as speakers and a printer). The computer apparatus 1620 connects to other network nodes through a network adapter 1636 (also referred to as a "network interface card" or NIC).

A number of program modules may be stored in the system memory 1624, including application programming interfaces 1638 (APIs), an operating system (OS) 1640 (e.g., the Windows® operating system available from Microsoft Corporation of Redmond, Wash. U.S.A.), software applications 1641 including one or more software applications programming the computer apparatus 1620 to perform one or more of the steps, tasks, operations, or processes of the hierarchical classification systems described herein, drivers 1642 (e.g., a GUI driver), network transport protocols 1644, and data 1646 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A method comprising:
    broadcasting, by a node of a wireless tracking system, an interrogation signal to one or more wireless tags, the one or more wireless tags associated with a plurality of assets;
    receiving, by the wireless tracking system, one or more identifiers corresponding to the one or more wireless tags;
    determining, by the wireless tracking system based on the received one or more identifiers, an event associated with the plurality of assets, wherein determining the event comprises:
        accessing, by the wireless tracking system, a plurality of associated identifiers from a database;
        comparing, by the wireless tracking system, the received one or more identifiers to the plurality of associated identifiers of the database; and
        identifying, by the wireless tracking system, that the received one or more identifiers is missing an identifier of the plurality of associated identifiers of the database; and
    transmitting, by the wireless tracking system, an alert of the determined event.

2. The method of claim 1, wherein transmitting an alert of the determined event further comprises transmitting one or more of: an identifier of a wireless tag, a location of the wireless tag, a description of the event, and one or more conditions associated with the event.

3. The method of claim 1, the one or more wireless tags comprising a radio frequency identifier (RFID) circuit, a radio frequency (RF) circuit, a processor, a memory storing an identifier (ID) associated with the RFID circuit, and an energy source electrically connected to the RFID circuit, the RF circuit, and the processor.

4. The method of claim 3, wherein the RF circuit is a Bluetooth Low Energy circuit.

5. The method of claim 1, wherein the determining is performed by the node of the wireless tracking system.

6. The method of claim 1, wherein the plurality of assets are being contained or transported within or as part of a container.

7. The method of claim 6, wherein the container is a specimen holder bin and each of the plurality of assets is a vial.

8. A method comprising:
    broadcasting, by a node of a wireless tracking system, an interrogation signal to one or more wireless tags, the one or more wireless tags associated with a plurality of assets;
    receiving, by the wireless tracking system, one or more identifiers corresponding to the one or more wireless tags;
    determining, by the wireless tracking system based on the received one or more identifiers, an event associated with the plurality of assets, wherein determining the event comprises:
        accessing, by the wireless tracking system, a plurality of associated identifiers from a database;
        comparing, by the wireless tracking system, the received one or more identifiers to the plurality of associated identifiers of the database; and
        identifying, by the wireless tracking system, that the received one or more identifiers includes an extraneous identifier not included in the plurality of associated identifiers of the database; and
    transmitting, by the wireless tracking system, an alert of the determined event.

9. The method of claim 8, wherein transmitting an alert of the determined event further comprises transmitting one or more of: an identifier of a wireless tag, a location of the wireless tag, a description of the event, and one or more conditions associated with the event.

10. The method of claim 8, the one or more wireless tags comprise comprising a radio frequency identifier (RFID) circuit, a radio frequency (RF) circuit, a processor, a memory storing an identifier (ID) associated with the RFID circuit, and an energy source electrically connected to the RFID circuit, the RF circuit, and the processor.

11. The method of claim 10, wherein the RF circuit is a Bluetooth Low Energy circuit.

12. The method of claim 8, wherein the determining is performed by the node of the wireless tracking system.

13. The method of claim 8, wherein the plurality of assets are being contained or transported within or as part of a container.

14. The method of claim 13, wherein the container is a specimen holder bin and each of the plurality of assets is a vial.

15. A wireless tracking system, comprising:
    a node configured to broadcast an interrogation signal to one or more wireless tags, the one or more wireless tags associated with a plurality of assets;

memory storing non-transitory computer readable instructions that when executed by a processor of the wireless tracking system cause the wireless tracking system to:

receive one or more identifiers corresponding to the one or more wireless tags;

determine, based on the received one or more identifiers, an event associated with the plurality of assets, wherein determine the event comprises:

access a plurality of associated identifiers from a database, compare the received one or more identifiers to the plurality of associated identifiers of the database, identify that the received one or more identifiers includes an extraneous identifier not included in the plurality of associated identifiers of the database, and transmit an alert of the determined event.

16. The wireless tracking system of claim 15, the instructions that cause the wireless tracking system to transmit an alert including further computer readable instructions that cause the wireless tracking system to transmit one or more of an identifier of a wireless tag, a location of the wireless tag, a description of the event, and one or more conditions associated with the event.

17. The wireless tracking system of claim 15, the one or more wireless tags comprising a radio frequency identifier (RFID) circuit, a radio frequency (RF) circuit, a processor, a memory storing an identifier (ID) associated with the RFID circuit, and an energy source electrically connected to the RFID circuit, the RF circuit, and the processor.

18. The wireless tracking system of claim 17, wherein the RF circuit is a Bluetooth Low Energy circuit.

19. The wireless tracking system of claim 15, wherein the instructions that cause the wireless tracking system to determine the event are executed by the node of the wireless tracking system.

20. The wireless tracking system of claim 15, wherein the plurality of assets are being contained or transported within or as part of a container.

21. The wireless tracking system of claim 20, wherein the container is a specimen holder bin and each of the plurality of assets is a vial.

\* \* \* \* \*